US006281900B1

(12) United States Patent
Ishikawa

(10) Patent No.: US 6,281,900 B1
(45) Date of Patent: Aug. 28, 2001

(54) INFORMATION PROCESSING APPARATUS AND METHOD, AND PROVIDING MEDIUM

(75) Inventor: Masayuki Ishikawa, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/204,003

(22) Filed: Dec. 1, 1998

(30) Foreign Application Priority Data

Dec. 5, 1997 (JP) .................................................... 9-352234

(51) Int. Cl.⁷ .................................................... G06F 3/14
(52) U.S. Cl. ........................... 345/356; 345/333; 345/335
(58) Field of Search .................................. 345/332, 333, 345/334, 335, 339, 340, 348, 349, 356; 709/220, 221, 223, 224

(56) References Cited

U.S. PATENT DOCUMENTS 5,821,937 * 10/1998 Tonelli et al. ......................... 345/356
5,889,954 * 3/1999 Gessel et al. ......................... 709/221
5,999,178 * 12/1999 Hwang et al. ......................... 345/348

* cited by examiner

Primary Examiner—John Cabeca
Assistant Examiner—Cao H. Nguyen
(74) Attorney, Agent, or Firm—Oblon, Spivak, McClelland, Maier & Neustadt, P.C.

(57) ABSTRACT

The invention provides an information processing apparatus and method and a providing medium by which editing of routing can be performed rapidly and readily. When a node which has no DEF name applied thereto is dropped into a route window, a routing editing tool provides a DEF name to the dropped node. When a node displayed in the route window or a scene graph window is dragged by a mouse and dropped to another node displayed in the scene graph window or the route window, the routing editing tool displays route candidates which can be set between the two nodes. When a user selects one of the displayed route candidates, the routing editing tool sets the selected route candidate as a route between the nodes.

44 Claims, 18 Drawing Sheets

MENU

73

76

73

73

73

73

76

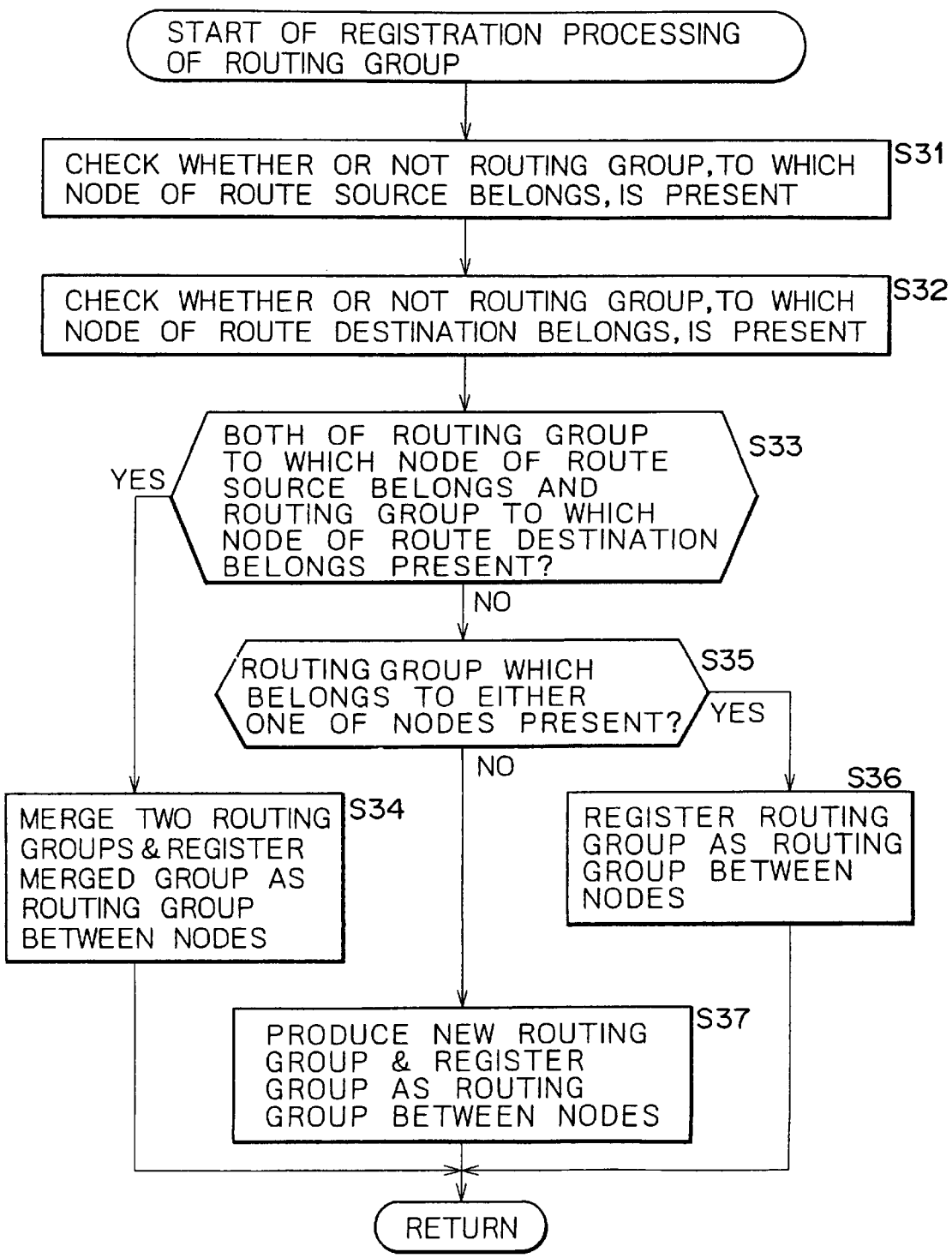

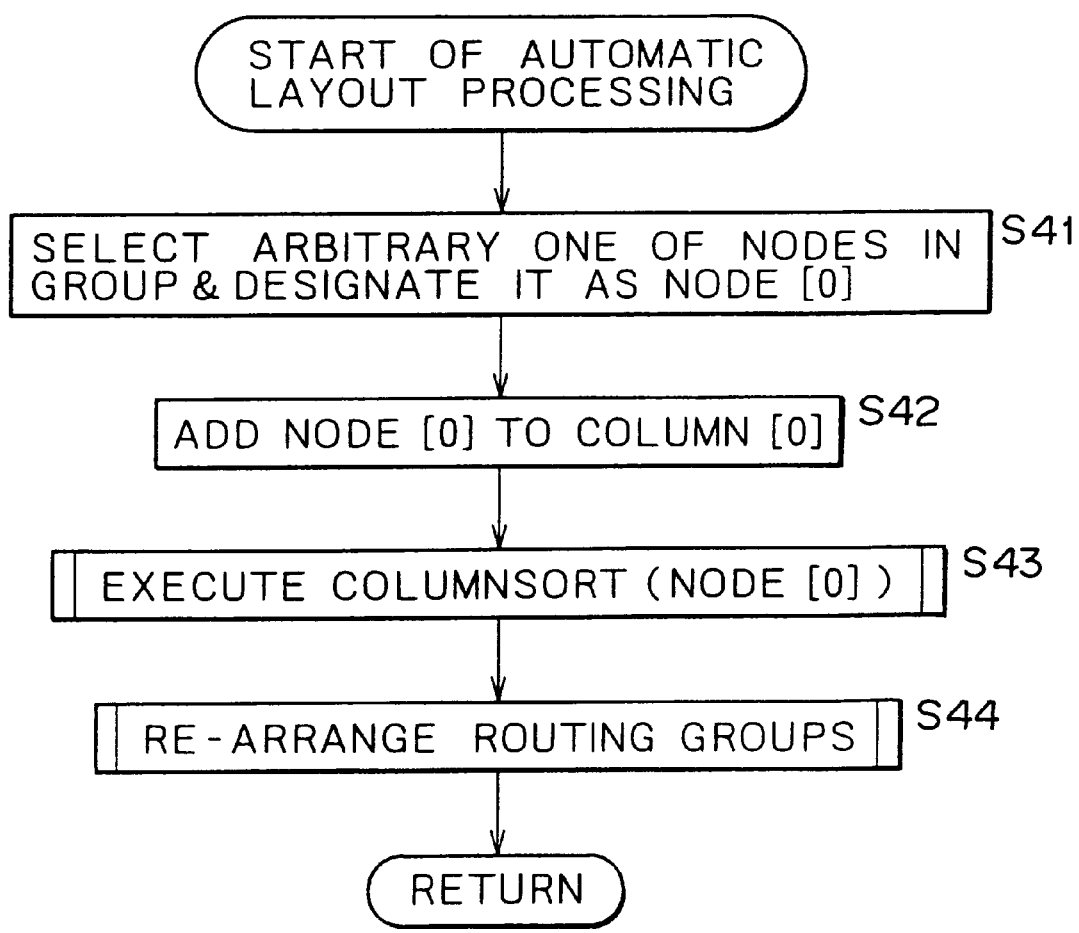

76

73

73

INFORMATION PROCESSING APPARATUS AND METHOD, AND PROVIDING MEDIUM

BACKGROUND OF THE INVENTION

This invention relates to an information processing apparatus and method and a providing medium, and more particularly to an information processing apparatus and method and a providing medium by which editing of routing for transmitting an event between nodes is performed when contents of a VRML which is used for representation of a three-dimensional imaginary space are produced.

It is known that, in the Internet which is a computer network built up in a worldwide scale, the VRML (Virtual Reality Modeling Language) is commonly used as a describing language by which three-dimensional information can be handled uniformly, making use of a framework of the WWW (World Wide Web) which provides various information.

As an information providing system which can be used on the Internet, the WWW developed by the CERN (European Center for Nuclear Research) of Switzerland is known. The WWW allows browsing of information of a text, an image, sound and so forth in the form of a hypertext, and asynchronously transfers information stored in a WWW server to a terminal such as a personal computer in accordance with a protocol called HTTP (Hyper Text Transfer Protocol).

A WWW server is composed of the HTTP, server software called daemon and HTML files in which hypertext information is stored. It is to be noted that the daemon is a background program for executing management and processing when operation is performed on the UNIX. The hypertext information is represented using a describing language called HTML (HyperText Markup Language). In a description of a hypertext by the HTML, a logical structure of a sentence is represented by a format designation called tags placed between "<" and ">". Description of a link to other information is performed using link information called anchor. In order to designate a location where information is present using the anchor, a character train called URL (Uniform Resource Locator) is used.

The protocol to be used to transfer a file described in the HTML is the HTTP. The HTTP has a function of transmitting a request for information from a client to a WWW server and transferring hypertext information of an HTML file to the client.

The WWW browser is used frequently for an environment in which the WWW is utilized. The WWW browser is a client software, such as the Netscape Navigator (trademark of Netscape Communications, a company of United States). The WWW Browser can be used to browse files such as the so-called homepages on WWW servers on the Internet, which are spread in a worldwide scale and conform to the URL, and allows access to various information sources of the WWW by successively tracing homepages between which a link is extended commonly known as net surfing.

In recent years, specifications of a three-dimensional graphics describing language called VRML which further expands the WWW to allow description of a three-dimensional imaginary space or setting of a link of a hypertext to an object drawn in three-dimensional graphics so that WWW servers can be successively accessed tracing such links have been developed, and a VRML browser for displaying a three-dimensional space described based on the specifications of the VRML has been developed.

Details of the VRML are disclosed in such documents as, for example, Mark Pesce, "VRML: Browsing and Building Cyberspace", 1995 New Readers Publishing ISBN 1-56205-498-8; Koichi Matsuda and Yasuaki Honda, "Latest Trend of VRML and CyberPassage", bit (Kyoritsu Publishing), 1996, Vol. 28, No. 7, pp29–36, No. 8, pp57–65, No. 9, pp29–36 and No. 10, pp49–58, and so forth.

Further, the official and complete specifications of "The Virtual Reality Modeling Language Version 2.0, ISO/IEC CD 14772" are laid open in "http://www.vrml.org/Specifications/VRML2.0/FINAL/spec/index.html", and the Japanese version of the same is disclosed in http://www.webcity.co.jp/info/andoh/VRML/vrml2.0/spec-jp/index.html".

Further, for example, software for a browser for the VRML 2.0 and a shared server called "Community Place (trade mark) Browser/Bureau" has been developed and put on the market by the assignee of the present patent application, Sony Corporation, and the β version (temporary provision version) of the above software can be downloaded from the homepage http://vs.sony co.jp through the Internet.

With the VRML 2.0 described above, it is possible to describe and represent an autonomous behavior of an object in a three-dimensional imaginary space. If it is tried to produce VRML contents using the VRML 2.0 with which an object moves around dynamically in a three-dimensional imaginary space, the following operation process is followed. It is to be noted that, in the following description, an aggregate of VRML files, script files and so forth for realizing a series of behaviors of an object in an imaginary space is called VRML contents.

In the following, a series of operations for producing such VRML contents is described.

A model production operation is an operation of describing a shape, a position and so forth of an object (model) to be arranged in an imaginary space in accordance with the VRML 2.0 to produce a basic VRML file.

Description of a sensor node is an operation of adding to a VRML file a description of a sensor node such as Touch-Sensor which generates an event when a click operation (pointing operation) by a mouse is performed to any objects in an imaginary space, TimeSensor which generates an event at a preset time or the like.

An editing operation of routing is an operation of adding to a VRML file a routing description for transmitting an event generated in response to a pointing operation to an object to which a sensor node is added or the like.

Description of a script node is an operation of adding to a VRML file a description regarding a script node for delivering an event transmitted by routing to an external script.

Production of a script file is an operation of describing (programming) a script with the Java language (Java is a trademark of Sun Microsystems of the United States) for realizing a behavior set in advance to each object in an imaginary space based on an event transmitted through a script node.

Desired VRML contents are produced through such various operations as described above.

Incidentally, when it is tried to produce VRML contents which involve autonomous behaviors of an object in an imaginary space based on the VRML 2.0, existing authoring software (for example, the 3D Studio Max (trademark) or the like) called modeler is used to produce a shape or animation of the object, and the shape or animation thus produced is outputted as a file of the format of the VRML 2.0. If the modeler does not support the format of the VRML 2.0, then it is necessary to use a converter or the like to convert the produced file into a file of the format of the VRML 2.0.

Then, such operations as to add descriptions of various sensor nodes and so forth prescribed by the VRML 2.0 to a VRML file using a text editor, produce a script with the Java language, add a corresponding script node to the script, add a route sentence and so forth are repeated. Then, finally upon confirmation of actual operation, a VRML browser conforming to the VRML 2.0 is started and the behavior of the object is confirmed by click operations of a mouse and so forth.

Here, when routing editing which associates nodes such as graphics data of a model, scripts and so forth is to be performed, nodes which make objects of the routing are provided with node names (DEF names) in advance, and the node name (NodeName) and a field name (eventOut) of a route source, and the node name and a field name (eventIn) of a route destination are selected using such route editing window as shown in FIG. 23 to effect the addition of a route. As a result, the added route is displayed as a character train in a combo box.

However, where a large number of routes are used, it is difficult to intuitively judge in what manner an event flows through the routes.

Further, in order to add a route, DEF names must be provided without fail to nodes which make objects of the routing, and this requires a lot of time.

SUMMARY OF THE INVENTION

It is an object of the present invention to provide an information processing apparatus and method and a providing medium by which editing of routing can be performed rapidly and readily.

In order to attain the object described above, according to an aspect of the present invention, there is provided an information processing apparatus which performs routing to interconnect nodes in order to allow transmission of an event between the nodes, comprising a dragging means for dragging a first node displayed in a first window for displaying and editing the nodes hierarchically or a second window for editing the routing, a dropping means for dropping the first node dragged by the dragging means to a second node displayed in the first window or the second window, a display means for displaying, when the first node is dropped onto the second node by the dropping means, route candidates which can be set between the first node and the second code, a selection means for selecting a predetermined route candidate from the route candidates displayed by the display means, and a setting means for setting the route candidate selected by the selection means as a route between the first node and the second node.

According to another aspect of the present invention, there is provided an information processing method wherein routing is performed to interconnect nodes in order to allow transmission of an event between the nodes, comprising a dragging step of dragging a first node displayed in a first window for displaying and editing the nodes hierarchically or a second window for editing the routing, a dropping step of dropping the first node dragged by the dragging step to a second node displayed in the first window or the second window, a displaying step of displaying, when the first node is dropped to the second node, route candidates which can be set between the first node and the second node, a selecting step of selecting a route candidate from the route candidates displayed by the displaying step, and a setting step of setting the route candidate selected by the selecting step as a route between the first node and the second node.

According to a further aspect of the present invention, there is provided a providing medium for providing a computer program which can be read and executed by an information processing apparatus, which performs routing to interconnect nodes in order to allow transmission of an event between the nodes, executes a dragging step of dragging a first node displayed in a first window for displaying and editing the nodes hierarchically or a second window for editing the routing, a dropping step of dropping the first node dragged by the dragging step to a second node displayed in the first window or the second window, a displaying step of displaying, when the first node is dropped to the second node, route candidates which can be set between the first node and the second code, a selecting step of selecting a route candidate from the route candidates displayed by the displaying step, and a setting step of setting the route candidate selected by the selecting step as a route between the first node and the second node.

In the information processing apparatus, information processing method and providing medium described above, when a first node displayed in a first window for displaying and editing nodes hierarchically or a second window for editing routing is dragged and then dropped onto a second node displayed in the first window or the second window, route candidates which can be set between the first node and the second code are displayed. Then, a route candidate is selected from the displayed route candidates and is set as a route between the first node and the second node. Consequently, routing editing can be performed rapidly and readily.

The above and other objects, features and advantages of the present invention will become apparent from the following description and the appended claims, in conjunction with the accompanying drawings in which like parts or elements are denoted by like reference symbols.

BRIEF DESCRIPTION OF THE DRAWINGS

FIG. 17 is a flowchart illustrating registration processing of a routing group of FIG. 15.

FIG. 18 is a flowchart illustrating details of the automatic layout processing of FIG. 15.

DESCRIPTION OF THE PREFERRED EMBODIMENT

Figure 1:
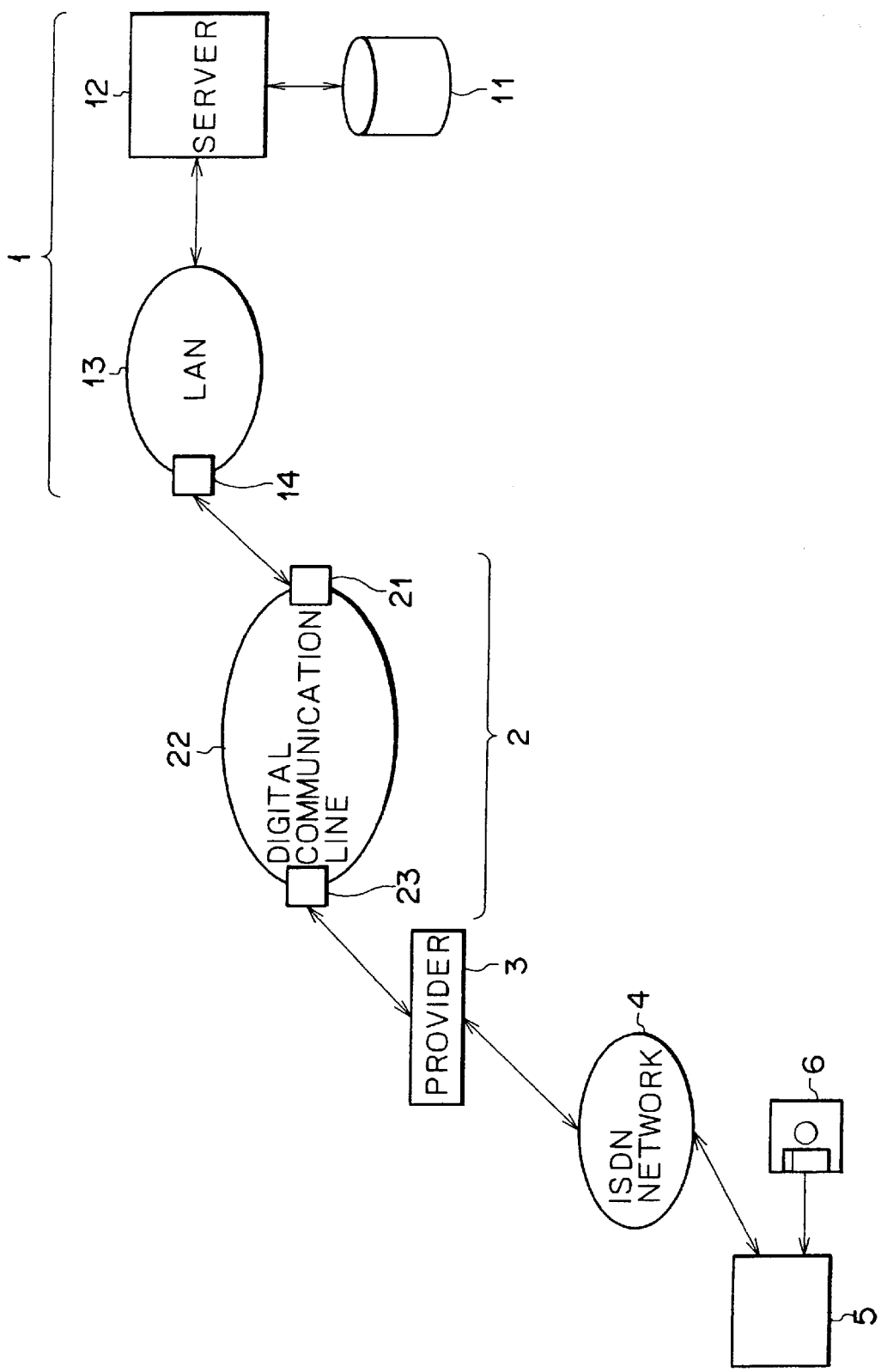
FIG. 1 is a diagrammatic view showing an example of a construction of a network system which uniformly handles information representing a three-dimensional imaginary space.

Before a preferred embodiment of the present invention is described, in order to make clear a corresponding relationship between various features recited in the claims and elements of the embodiment of the present invention described below, the features of the present invention are described below together with the corresponding elements to which reference symbols denoting them are added in parentheses following them. However, this description provides a mere example and does not signify that the features of the present invention be limited to the recited elements.

An information processing apparatus according to one embodiment of the present invention, comprises dragging means (for example, a mouse 38b of FIG. 2) for dragging a first node displayed in a first window for displaying and editing nodes hierarchically or a second window for editing routing, dropping means (for example, the mouse 38b of FIG. 2) for dropping the first node dragged by the dragging means onto a second node displayed in the first window or the second window, display means (for example, a display unit 35 of FIG. 2) for displaying, when the first node is dropped onto the second node by the dropping means, route candidates which can be set between the first node and the second code, selection means (for example, the mouse 38B of FIG. 2) for selecting a predetermined route candidate from the route candidates displayed by the display means, and setting means (for example, the routing editing tool 522 of FIG. 3) for setting the route candidate selected by the selection means as a route between the first node and the second node.

The information processing apparatus according to one embodiment of the present invention, further comprises addition means (for example, the routing editing tool 522 of FIG. 3) for applying, when the predetermined node is dropped into the second window by the dropping means, if the node does not have a name applied thereto, a name to the node.

The information processing apparatus according to yet another embodiment of the present invention, further comprises a second display means (for example, the routing editing tool 522 of FIG. 3) for displaying that the dropping is possible, when the first node is dragged to a position on the second node by the dragging means, if routing is possible between the first node and the second node, and third display means (for example, the routing editing tool 522 of FIG. 3) for displaying that the dropping is impossible, if the routing between the first node and the second node is impossible.

The information processing apparatus according to a further embodiment of the present invention, further comprises layout means (for example, the routing editing tool 522 of FIG. 3) for laying out display contents of the second window in accordance with the setting by the setting means.

The information processing apparatus according to still a further embodiment of the present invention, further comprises indication means (for example, the mouse 38b of FIG. 2) for indicating predetermined nodes displayed in the first window, and second display means (for example, the routing editing tool 522 of FIG. 3) for displaying, to any of the nodes displayed in the second window which depends upon the node indicated by the indication means, that the node is in a dependence relationship.

Referring to FIG. 1, there is shown a construction of a network system which uniformly handles a three-dimensional space and to which an information processing apparatus of the present invention is applied. The network system shown includes, as principal components, a private network 1, the Internet 2, a provider 3, an integrated services digital network (ISDN network) 4, and a client terminal 5 connected to each other. It is to be noted that, while the network system can actually include a plurality of private networks, internets, providers and client terminals, it is shown in FIG. 1 that the number of each of the components is only one for simplified illustration and description. In the network system shown in FIG. 1, data communication between a server 12 of the private network 1 and the client terminal 5 is realized by a local area network (LAN) 13 of the private network 1, a digital communication line 22 of the Internet 2, the provider 3 and the ISDN network 4.

The private network 1 includes a server 12 having a hard disc 11, a LAN 13, and a gateway server 14. The server 12 is, for example, a server for Community Place (trademark) provided on the Internet (http://vs.sony.co.jp/) by the assignee of the present application and is constructed such that it acquires contents produced by a user using a contents production tool 50 (which will be hereinafter described with reference to FIG. 3), in short, graphics data (a VRML file) indicating a shape, a position and so forth of a three-dimensional object (model) described by the VRML 2.0, and a script (VRML contents composed of a file or the like) which is described in a program language such as the Java language by the user through the network or the like and stores and manages the contents onto and on the local hard disc 11.

Further, the server 12 transfers, in response to a request for transfer from the client terminal 5, contents of a three-dimensional imaginary space stored on the hard disc 11 to the client terminal 5 of the source of the request through the LAN 13, Internet 2, provider 3 and ISDN network 4 (such communication nodes in the network system are generally and suitably referred to simply as network). Further, the server 12 transfers a program for production of contents (the contents production tool 50 which will be hereinafter described with reference to FIG. 3) to the client terminal 5 through the network or a recording medium 6 such as, for example, a floppy disk.

The Internet 2 includes routers 21 and 23, and a digital communication line 22.

Figure 2:
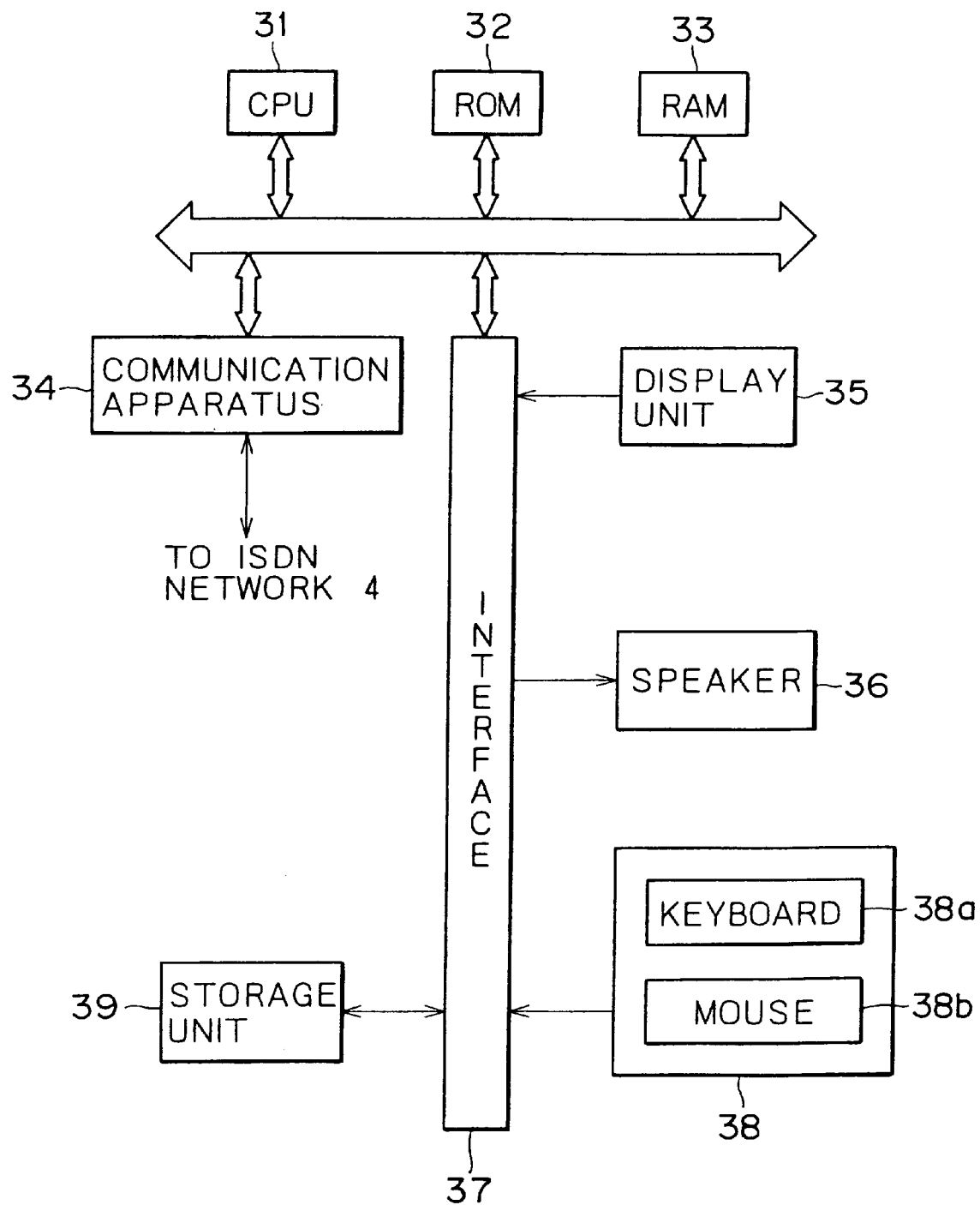
FIG. 2 is a block diagram showing an example of a construction of a client terminal shown in FIG. 1.

FIG. 2 shows an example of a construction of the client terminal 5 of FIG. 1. Referring to FIG. 2, the client terminal 5 shown includes a CPU 31 which executes various processes in accordance with a program stored in a ROM 32. A RAM 33 suitably stores data, a program and so forth necessary for the CPU 31 to execute various processes. A communication apparatus 34 supplies and receives data through the ISDN network 4.

A display unit 35 includes, for example, a CRT, an LCD or the like and can display a three-dimensional image or the like of CG (computer graphics). A speaker 36 outputs a sound signal. A keyboard 38a of an inputting apparatus 38 is operated to input predetermined characters, symbols and so forth, and a mouse 38b is operated to point at a predetermined position (for example, a model). A storage unit 39 which is formed from, for example, a hard disc, an optical disc, an MO disc or a floppy disc stores a contents production tool 50 and various data. An interface 37 forms an interface of data with the display unit 35, speaker 36, inputting apparatus 38 and storage unit 39.

The client terminal 5 receives, through the communication apparatus 34, VRML contents downloaded from the server 12 of FIG. 1 through the network and causes the display unit 35 to display them.

Further, the client terminal 5 installs the contents production tool 50 supplied from the server 12 through the network or the recording medium 6 into the storage unit 39, starts the contents production tool 50 in response to an operation of the user to produce contents of a three-dimensional imaginary space, and uploads the produced VRML contents to the server 12 through the network or the recording medium 6.

Furthermore, the client terminal 5 starts, in response to a pointing operation to a displayed model using the inputting apparatus 38 by the user or the like, for example, a script for changing the color of the pointed model, for moving the model or the like to vary the contents of the display of the three-dimensional imaginary space.

In short, by varying the contents of the display interactively in response to an operation of the user for a model of a three-dimensional imaginary space, the client terminal 5 causes the user to have such a feeling as if the user itself moves or touches with and operates the model to move it or generate sound.

Figure 3:
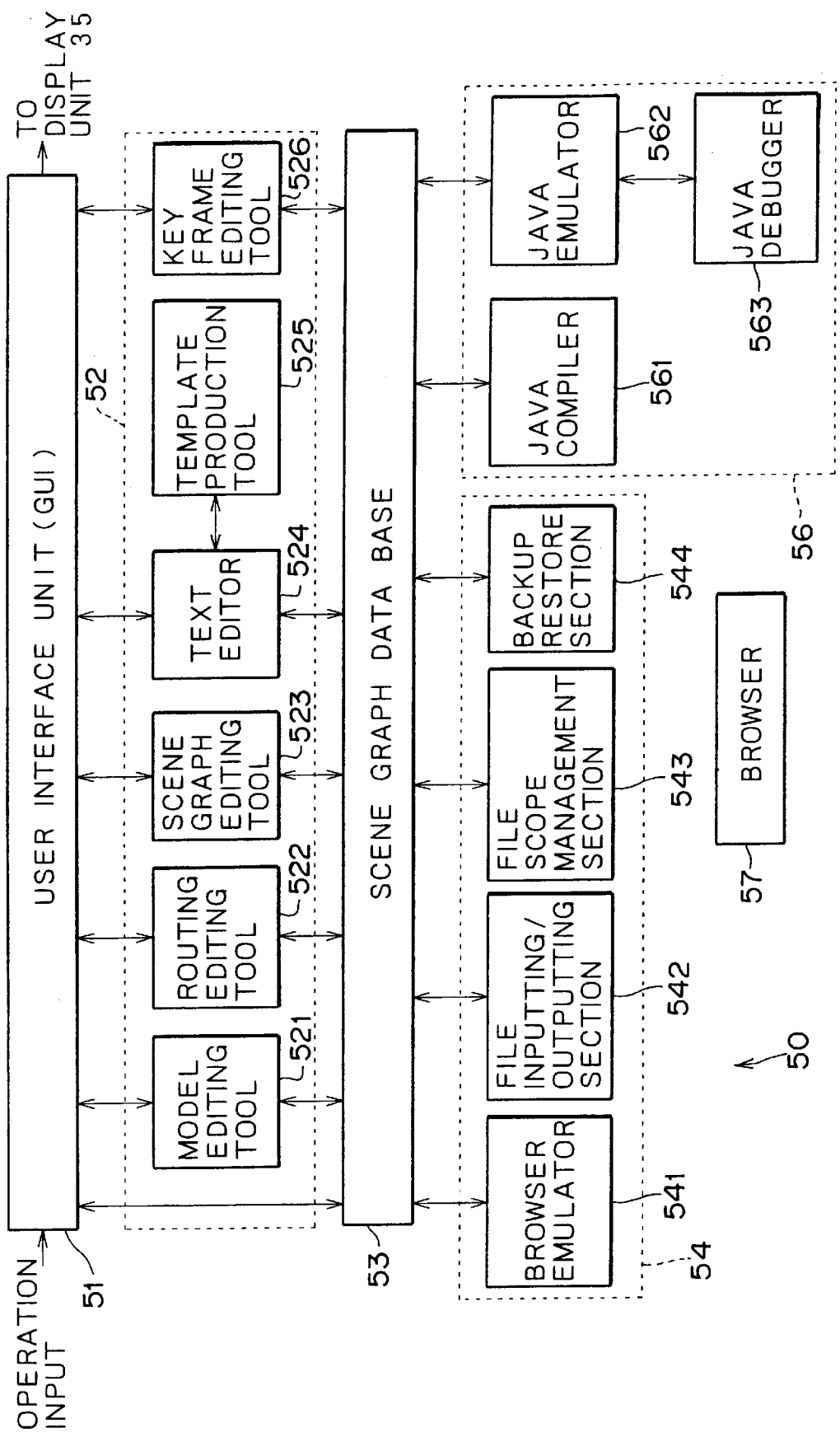
FIG. 3 is a block diagram showing an example of a construction of a contents producing tool which is operated in the client terminal shown in FIGS. 1 and 2.

FIG. 3 shows an example of a construction of the contents production tool 50 which operates in the client terminal 5 shown in FIGS. 1 and 2. Referring to FIG. 3, the contents production tool 50 includes a user interface unit 51 (GUI: Graphical User Interface), an editing tool 52, a scene graph database 53, a working tool 54, a script production section 56, and a browser 57.

The editing tool 52 includes a model editing tool 521, a routing editing tool 522, a scene graph editing tool 523, a text editor 524, a template production tool 525 and a key frame editing tool 526. The working tool 54 includes a browser emulator 541, a file inputting/outputting section 542, a file scope management section 543, and a backup restore section 544. The script production section 56 includes a Java compiler 561, a Java emulator 562, and a Java debugger 563.

The contents production tool 50 is software to be installed into the storage unit 39 of and used by the client terminal 5 of FIG. 2, and is distributed through the network or the recording medium 6 and uniformly coordinates a model production operation and an interaction production operation with each other to perform production of contents.

In the following, the components of the contents production tool 50 are described.

The user interface unit 51 shown in FIG. 3 displays an image, which is used for inputting various data to be used for production of contents of a three-dimensional imaginary space, on the display unit 35 of FIG. 2 using the form of a window. Further, the user interface unit 51 accepts operation input data inputted when the user operates various buttons in a window displayed on the display unit 35 using the mouse 38b of the inputting apparatus 38 or operation input data inputted from the keyboard 38a, and supplies necessary data to each required tool of the editing tool 52 or the scene graph database 53. In short, the user interface unit 51 provides a GUI environment to the user.

Further, the user interface unit 51 receives display output data from the editing tool 52 or the scene graph database 53 and displays it in a predetermined window of the display unit 35. It is to be noted that the components of the editing tool 52, the scene graph database 53 and the working tool 54 are started in response to operation input data inputted to the user interface unit 51 and performs the process based on the operation input data supplied from the user interface unit 51.

The editing tool 52 provides functions necessary for production of graphics data of a model in a three-dimensional image space and an interaction program to a user. In the editing tool 52, the model editing tool 521 produces graphics data indicative of attributes of a model such as color (shape), position and movement using data for production of a model inputted by an operation of the user on a model editing window displayed on the display unit 35. Further, the model editing tool 521 outputs produced graphics data (attributes of a model) to the scene graph database 53. Furthermore, the model editing tool 521 displays produced graphics data three-dimensionally or two-dimensionally at a predetermined position of a model editing window on the display unit 35 through the user interface unit 51.

It is to be noted that the model editing tool 521 may edit graphics data stored in the storage unit 39, graphics data read out from the recording medium 6 or graphics data provided through the network.

The routing editing tool 522 executes routing editing of coordinating graphics data of models having names applied thereto in a scope (VRML file which makes an object of editing) and nodes of a script or the like. The routing editing process is hereinafter described with reference to FIG. 9. It is to be noted that, upon routing, the type of an attribute (field), for example, SFBool (field including a single theoretical value) or the like, must exhibit coincidence between nodes of the routing source and the routing destination.

In the VRML, it is possible to arrange nodes hierarchically. The scene graph editing tool 523 edits a hierarchical structure of models and invisible nodes (script nodes or the like). For the hierarchical structure of nodes, a structure wherein, for example, a VRML file F1 indicating a leaf, a VRML file F2 indicating a branch, a VRML file F3 indicating a trunk and a VRML file F4 indicating a route are hierarchies below a VRML file F5 indicating a tree can be exhibited as a concrete example.

Figure 4:
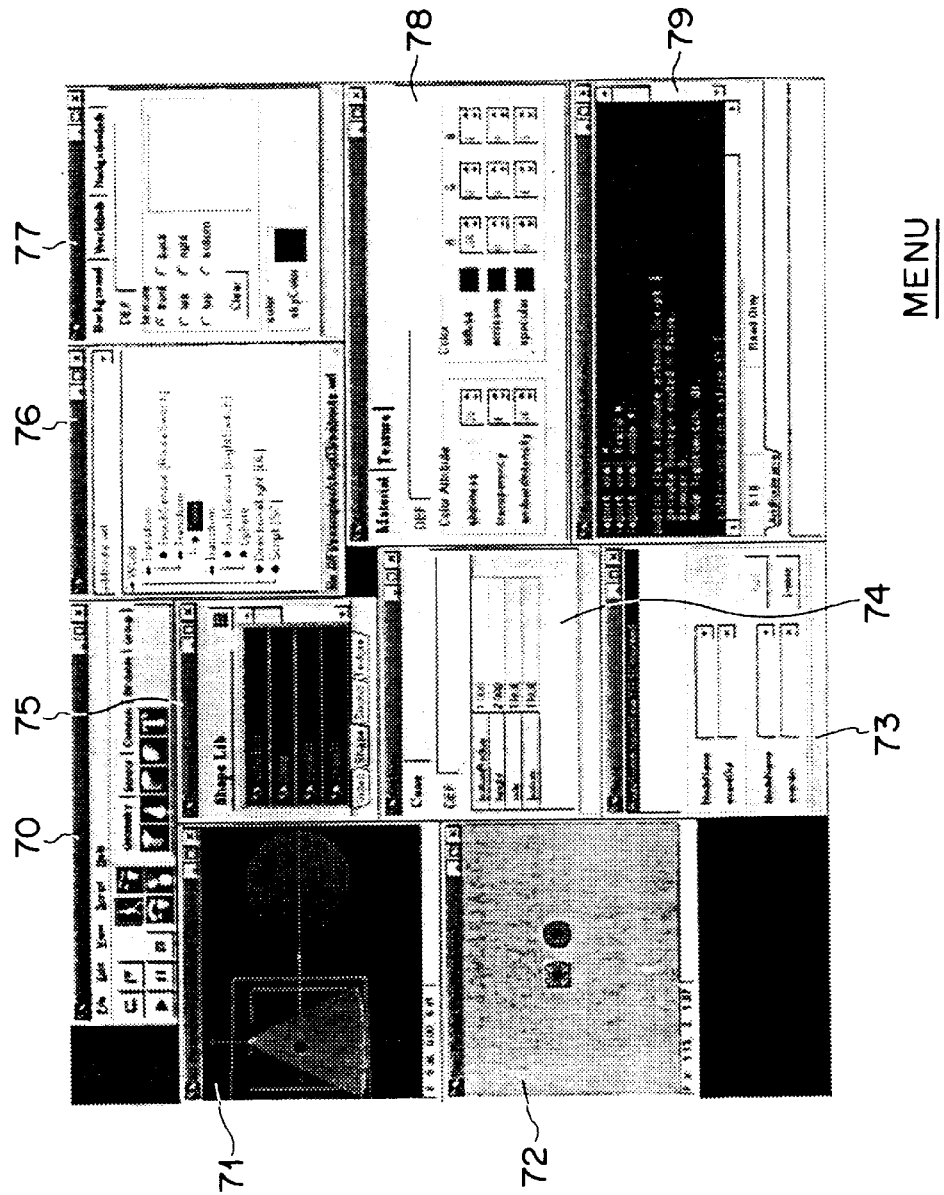
FIG. 4 is a photograph of a half-tone image showing a menu screen displayed on a display unit by the contents producing tool shown in FIG. 3.

If a user selects a predetermined VRML file as an object of editing at present, then the scene graph editing tool 523 displays nodes referred to by the selected VRML file in the form of a tree (scene graph) in a scene graph window 76 (refer to FIG. 4). A set of nodes referred to by a VRML file of an object of editing in this manner is referred to as file scope (or current scope). The scene graph editing tool 523 limits a node which makes an object of editing such as routing, production of a key frame, production of a script or the like to a file scope displayed in the scene graph window 76. Further, contents of a file scope and nodes which make an object of editing are changed, in response to changing of a VRML file of an object of editing by the user, to nodes which are referred to by the VRML after the change.

The text editor 524 has an editor function of a programming language suitable for production of a script such as the Java language, and performs production of a source program of a script, and automatically performs addition, deletion and variation of a variable in response to an editing operation for a script node.

The template production tool 525 is a tool which is used to provide a user with facilities, and operates in association with the text editor 524 to interactively produce a program (template) which makes the original form of a script in response to an operation of the user for a window called "Script Expert" displayed on the display unit 35 and output the program to the text editor 524. With the template production tool 525, the user can produce a script readily by suitably modifying a source program (a model of a script) based on need, provided by the template production tool 525 and finished to some degree.

The key frame editing tool 526 produces animation with which the condition of a model (for example, the coordinates of a model) edited with the model editing tool 521 varies on a screen.

The scene graph database 53 stores data produced by the tools of the editing tool 52 into the RAM 33 of FIG. 2 and manages the data such that it provides, in response to a request from any of the components of the editing tool 52 and the working tool 54, the stored data at a high speed to the requesting component.

The working tool 54 provides the user functions necessary for contents production operations such as confirmation of produced contents, confirmation of operation of a script, recording and reproduction of data and so forth.

In the working tool 54, the browser emulator 541 is used to allow the user to confirm operation of produced contents. The browser emulator 541 is started when a "Play" button (which will be hereinafter described) provided in an inputting image displayed on the display unit 35 is operated, and displays contents stored in the scene graph database 53 in a modeling window of the screen of the display unit 35 and further varies the displayed contents in response to an operation of the user.

In short, the browser emulator 541 emulates operation of the browser 57 and indicates, to the user, the same contents as those when the browser 57 is used. It is to be noted that the browser emulator 541 stops its operation when a "Stop" button (which will be hereinafter described) provided on the inputting image or the like is operated, and in response, the user interface unit 51 displays the original inputting image.

The file inputting/outputting section 542 records graphics data [a VRML file (extension: .wrl)] of contents stored in the scene graph database 53, a script (extension: java), a texture file (extension: .bmp, .jpg, .gif) or a sound file (extension: .wav, .mod) into the storage unit 39 or onto the recording medium 6. On the other hand, the file inputting/outputting section 542 outputs various data of contents read out from the storage unit 39 or the like to the scene graph database 53.

In the VRML, one scope (a name applied to a node and a range within which routing is possible) is provided for each file (extension: .wrl) of graphics data, and management of node names and routing is performed in units of a scope. The file scope management section 543 performs management of node names of the scene graph database 53, automatic production of a node name and retrieval of a node, and propagates, when a node refers to a plurality of same graphics data files, the modification to the graphics data files to all of nodes to be referred to.

When the browser emulator 541 displays a scene which allows interactive operation, the condition of a node is varied in response to an operation by the user, and therefore, if no countermeasure is taken, the display of the original scene cannot be restored. Therefore, the backup restore section 544 receives from the scene graph database 53 and stores the initial states of each node of a scene (three-dimensional imaginary space produced from an VRML file) displayed first in a modeling window when the browser emulator 541 is started in response to an operation of the Play button.

Further, the browser emulator 541 outputs, when it stops its operation in response to depression of the Stop button, stored states of each node to the scene graph database 53. It is to be noted that the user interface unit 51 displays a three-dimensional imaginary space in the modeling window based on initial states of each node inputted to the scene graph database 53.

The script production section 56 has a function of compiling a script produced by the user using the text editor 524, an operation confirming function and a debugging function.

In the script production section 56, the Java compiler 561 compiles a source program of a script by the Java language stored in the scene graph database 53 to produce an object program and outputs the object program to the scene graph database 53.

The Java emulator 562 and the Java debugger 563 operate as an interpreter of a program described in the Java language and is used to allow the user to perform confirmation of operation and debugging of a script program. In short, the Java emulator 562 emulates operation of an object program of a script stored in the scene graph database 53, and the Java debugger 563 outputs a state of the Java emulator 562 upon emulation operation and an error which has occurred to the scene graph database 53.

The browser 57 is an improvement over, for example, a browser which is used to browse the ordinary WWW in that it is suitable for displaying a three-dimensional imaginary space, and causes the display unit 35 to display contents of a three-dimensional imaginary space read out from the storage unit 39 or contents of a three-dimensional imaginary space transmitted from the server 12 of FIG. 1 through the network. Further, the browser 57 causes the display unit 35 to display a help file in association with an operation of any of the components of the user interface unit 51, editing tool 52, scene graph database 53 and working tool 54. It is to be noted that, for the browser 57, the "Communication Place (trademark) Browser" provided by the assignee of the present application can be used.

In the following, characteristic functions of the contents production tool 50 are described. If the user presses the Play button (which will be hereinafter described with reference to FIG. 5) displayed in a window in the screen of the display unit 35 using the mouse 38b, then the browser emulator 541 executes contents which have been produced thus far and displays the contents (operation confirmation function). This function eliminates a time required to start the browser 57 for confirming operation of the produced contents after the contents are stored once, and besides, allows the user to confirm operation of the contents, which have been produced by the operation till then, at an arbitrary timing during the contents production operation.

If the user presses the Play button in order to confirm the operation, the Java compiler 561 automatically compiles a source program of a script (for example, a file having the extension ".java") and produces an object program (MAKE function).

The backup restore section 544 stores a condition of the contents and a view point of the user upon starting the operation confirmation so that, when the browser emulator 541 stops its execution of the contents as the user presses the Stop button displayed in the window in the screen of the display unit 35 using the mouse 38b, the contents are returned to the same condition as that of the operation confirmation upon starting to return the displayed contents of the models and the view point of the user to the same conditions as those upon starting of the operation confirmation (backup restore function).

The user can use the text editor 524 to produce a source program of a script in a language suitable for script production such as the Java language and compile the produced source program using the Java compiler 561 to produce an object program (production of a script program). This object program is executed not only when the contents are operated by the browser, but also when confirmation of operation is performed by the browser emulator 541. Further, if a debug code is additionally provided to the source program and the source program is executed by the Java emulator 562, the Java debugger 563 can display input/output values of the script and so forth, so that a debug operation of the script can be performed (debugging function).

After the user sets input/output values of script nodes in an interactive fashion, the template production tool 525 produces a template of a source program of the script suitable for the setting (automatic template production function). The user can produce a source program of the script which realizes a desired event by suitably modifying the template using the text editor 524. Due to this function, the user can eliminate the time and work required to produce a source program of the script entirely by an editor, and moreover can prevent the occurrence of a simple coding miss.

FIG. 4 shows a menu screen which is displayed on the display unit 35 (FIG. 2) by the user interface unit 51 of the contents production tool 50. While, in the menu screen shown, all windows are shown, it is of course possible to display only the necessary windows.

Referring to FIG. 4, a conductor window 70 is used to perform general management of the contents production tool 50 and allows new production, reading in, save, execution of a confirmation operation of produced contents or stopping of a confirmation operation. The conductor window 70 further allows switching of a mouse mode, addition of a model or deletion of a model, and so forth.

In a 3D view window 71, a three-dimensional perspective view (3D perspective view) of an object corresponding to produced graphics data is displayed. The 3D view window 71 allows variation of an operation mode of a model (rotation or movement of the model, or movement of the view point) or display of an image of a selected model after being rotated or moved.

In a parallel view window 72, a side view (SideView), a top view (Top View) or a view by a wire frame (Wireframe) of a model displayed in the 3D view window 71 are displayed two-dimensionally.

A route window 73 is used to edit routing of an event (which will be hereinafter described with reference to FIG. 6).

An attribute window 74 is used to set an attribute of a node for which routing is to be performed and a node name (DEF name) of the node. It is to be noted that setting of a DEF name can be performed alternatively using the scene graph window 76 and the route window 73. This will be hereinafter described.

A resource library window 75 is used to perform management of four libraries of the moving pictures (Video), shapes of graphics forms (Shape), sound (Sound) and textures (Texture).

In a scene graph window 76, nodes of a current scope are displayed in a hierarchical arrangement.

A world information window 77 is used to perform setting of three nodes of a background (Background) node, a world information (Worldinfo) node and a navigation information (Navigationinfo) node. In the world information window 77, in setting of a background node, a texture of the background and a background color can be set; in setting of world information, a title, a name of a producing person, a date of production and so forth can be set to a VRML file; and in setting of a navigation mode, an operation upon navigation can be set.

An appearance window 78 is used to perform setting of a color of a model (Material) or a texture to be applied to a model.

A script editor 79 is used to edit a VRML file or a Java file, and also it can compile a Java program.

Figure 5:
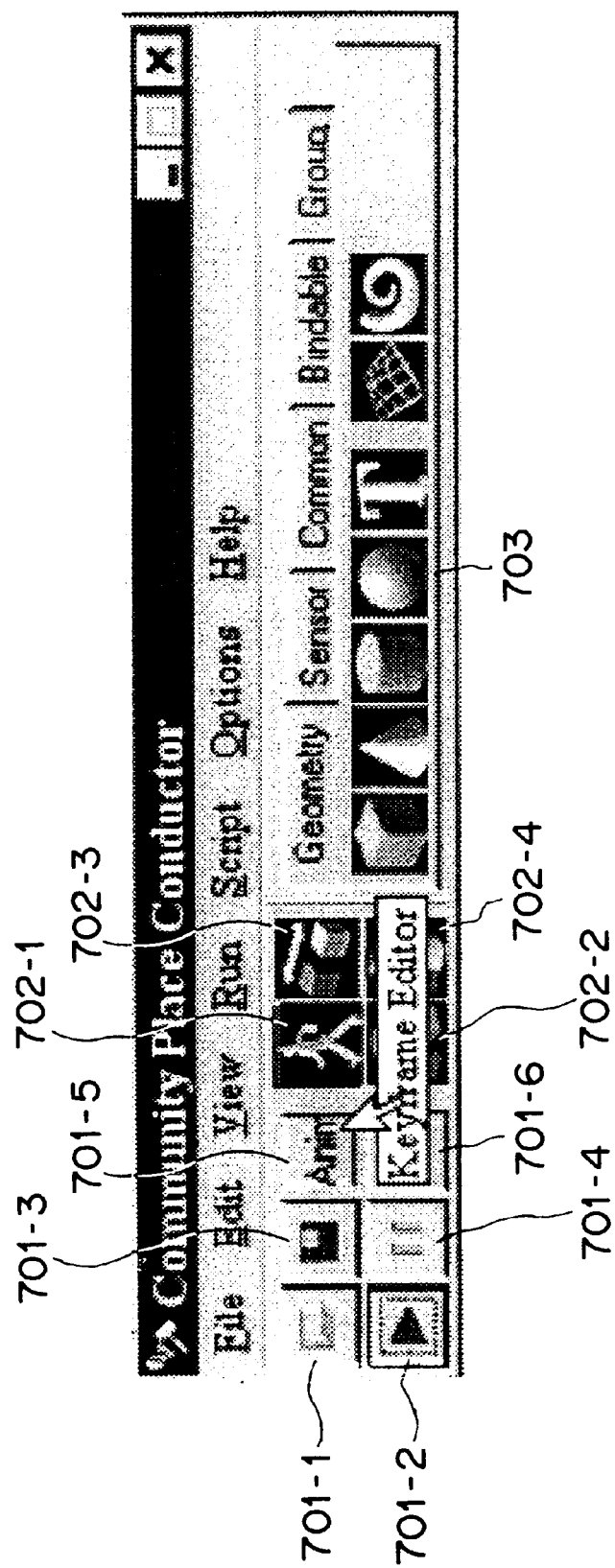
FIG. 5 is a photograph of a half-tone image showing an example of a display of a conductor window shown in FIG. 4.

FIG. 5 shows an example of a construction of the conductor window 70 of FIG. 4. A button (File button) 701-1 is operated, for example, to read in contents stored as a file in the storage unit 39. A button (Play button) 701-2 is operated to execute a confirmation operation of produced contents (simulation mode). A button (Save button) 701-3 is operated to store contents, for example, into the storage unit 39. A button (Pause button) 701-4 is operated to temporarily stop a confirmation operation being executed. A button (Anime button) 701-5 is operated to start a key frame editor (KeyFrame Editor) for producing animation or to end a key frame editor being operated. A button (Stop button) 701-6 is operated to stop a confirmation being executed.

Buttons 702-1 to 702-4 are used to set a mouse mode. The button (Navigator button) 702-1 is used to set a mode for moving the viewpoint in the parallel view window 72 or the 3D view window 71. The button (Rotate button) 702-2 is operated to set a mode for rotating a model. The button (Move button) 702-3 is operated to set a mode for moving a model. The button (Scale button) 702-4 is operated to set a scale of a model.

A primitive bar 703 is used to select and add a geometry (Geometry) node, a sensor (Sensor) node, a common (Common) node, a bindable (Bindable) node or a group (Group) node.

Figure 6A:
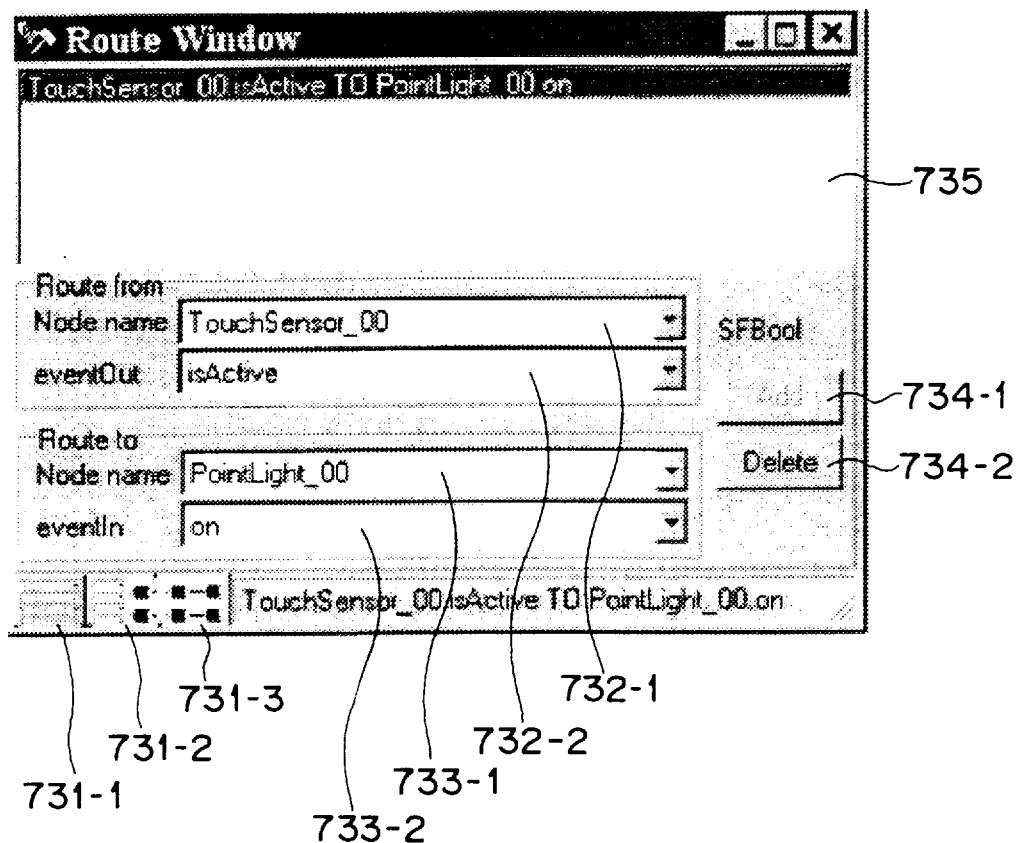
FIGS. 6A and 6B are photographs of half-tone images showing examples of a display of a route window in a text display and a visual display, respectively.
Figure 6B:
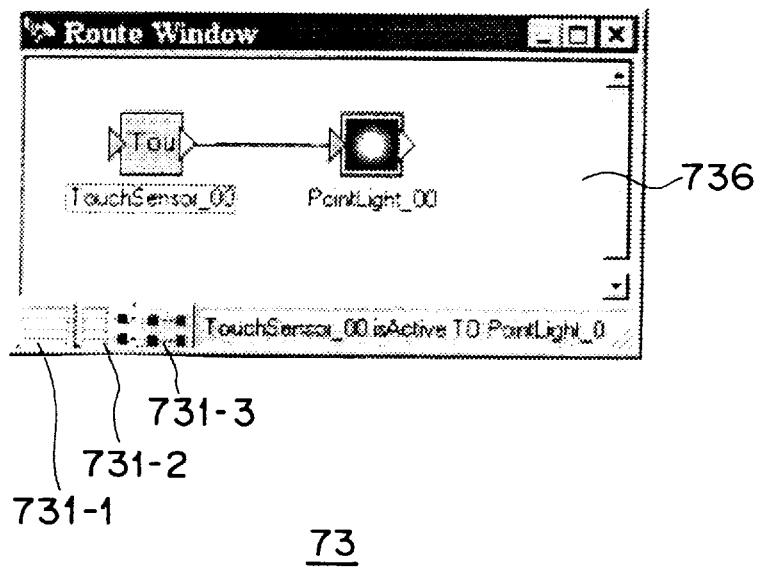
Figure 7:
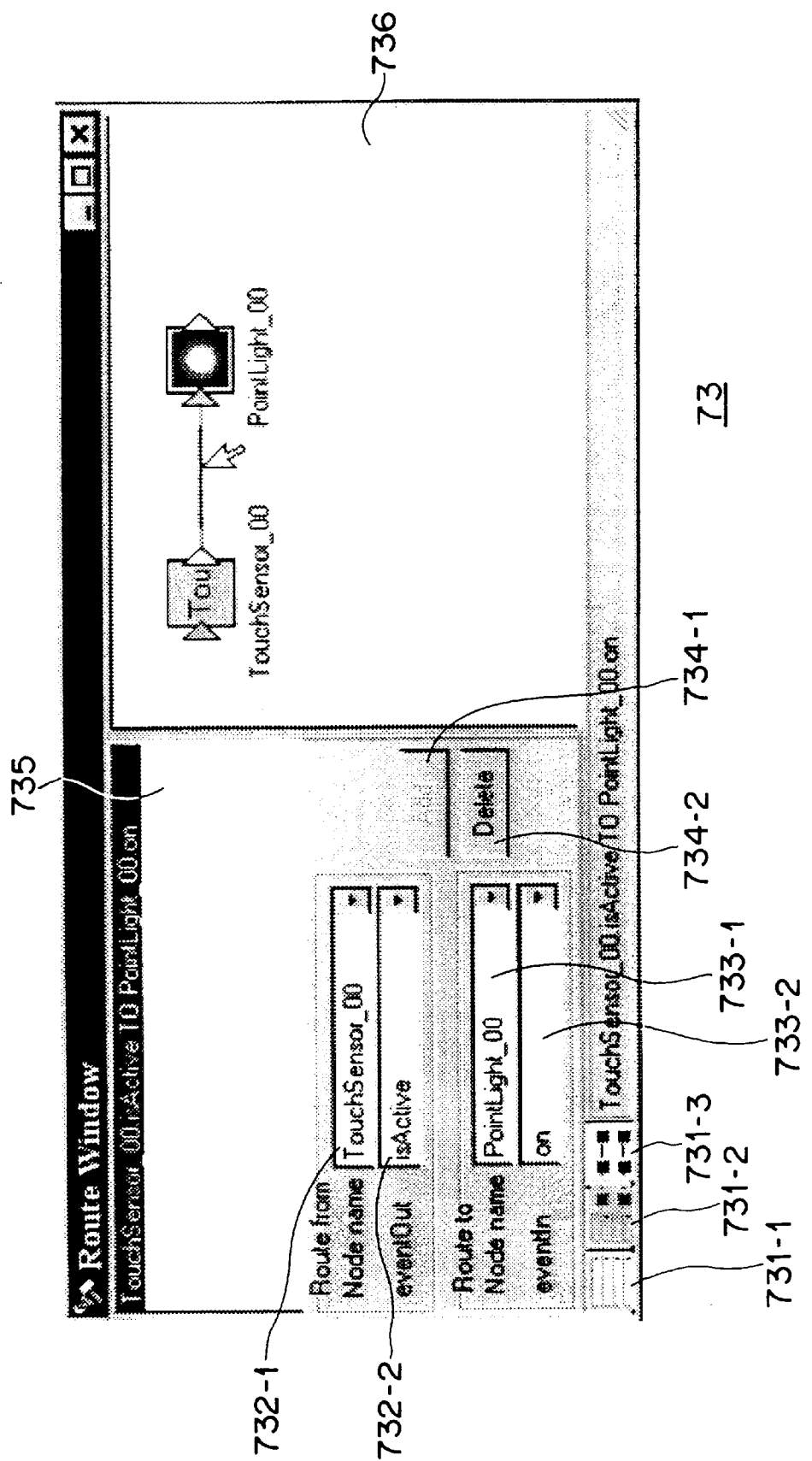
FIG. 7 is a photograph of a half-tone image showing an example of a display of the route window in a text and visual mixed display.

Subsequently, processing for editing routing in the route window 73 is described. The route window 73 is used to provide a text display as shown in FIG. 6(A), a visual display as shown in FIG. 6(B) or else a mixed display of them as shown in FIG. 7 by selecting one of buttons 731-1 to 731-3. The button 731-1 is operated to select the text display; the button 731-2 is operated to select the visual display; and the button 731-3 is operated to select the mixed display.

In the text display example of FIG. 6(A), a combo box 732-1 is used for setting a node name (Node name) on the output side, and a combo box 732-2 is used for setting an event on the output side (eventOut). It is to be noted that the indication of "SFBool" on the right side represents that the type of the event to be transferred by an event "isActive" selected by the combo box 732-2 is SFBool. A combo box 733-1 is used for setting a node name on the input side, and a combo box 733-2 is used for setting an event on the input side (eventIn). In a window 735, a route corresponding to such settings is displayed. A button (Add) 734-1 is operated to add a set route, and another button (Delete) is operated to delete a route in a selected condition.

In the visual display example of FIG. 6(B), editing of routing can be performed visually with an icon displayed in a window 736. In the example shown, an icon indicating a node on the output side (TouchSensor__00) and another icon indicating a node on the input side (PointLight__00) are displayed, being connected with a line indicating a route. Consequently, the user can visually discriminate a condition of the routing between the two nodes. Further, if the line interconnecting the two icons is clicked with the mouse 38b, then a condition of the routing then is displayed in a character train (in the case just described, TouchSensor__00.isActive TO PointLight__00.on).

In the text and visual mixed display of FIG. 7, selection of a route is performed in an interlocking relationship. In particular, if a route is selected, for example, by the mouse 38b on the visual display side, then also on the text display side, a selected condition is displayed as shown in FIG. 7. Also a reverse interlocking operation is performed similarly.

Figure 8:
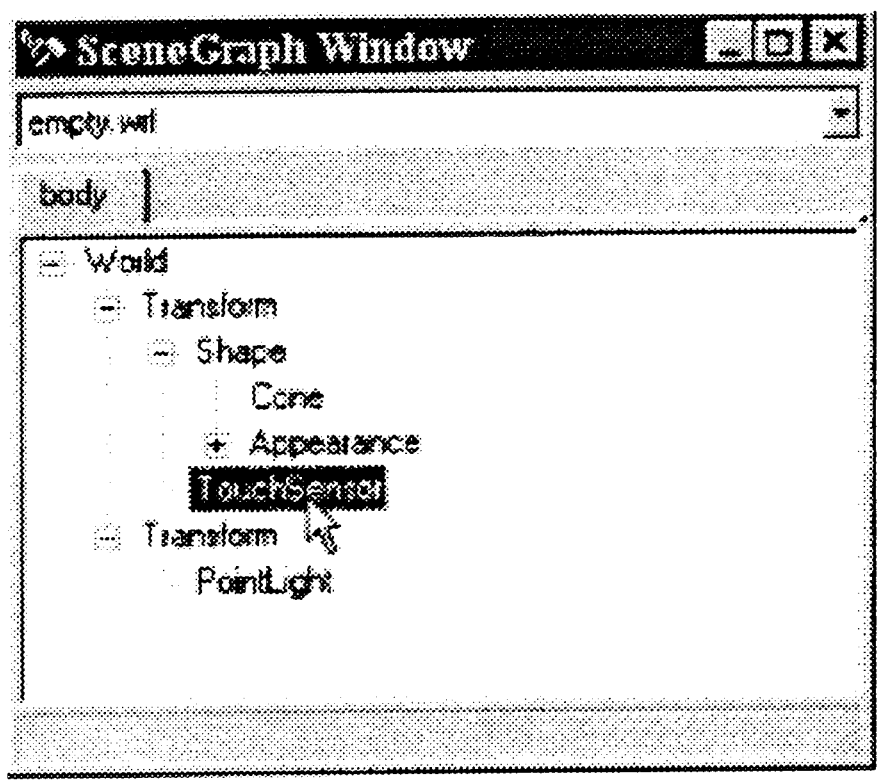
FIG. 8 is a photograph of a half-tone image showing an example of a display of a scene graph window.

Now, it is assumed to produce contents by which, when a cone of, for example, a model is clicked, the cone is lit or extinguished. In this instance, the route window 73 is used to perform setting of routing from a TouchSensor node to a PointLight node. It is assumed that a file scope which makes an object of editing in this instance is read in the scene graph window 76 in advance as shown in FIG. 8. In this instance, the scene graph editing tool 523 limits those nodes which are made an object of editing such as routing or production of a script, to the file scope displayed in the scene graph window 76. It is to be noted that, in the following processing, the visual display is used for the route window 73.

Figure 9:
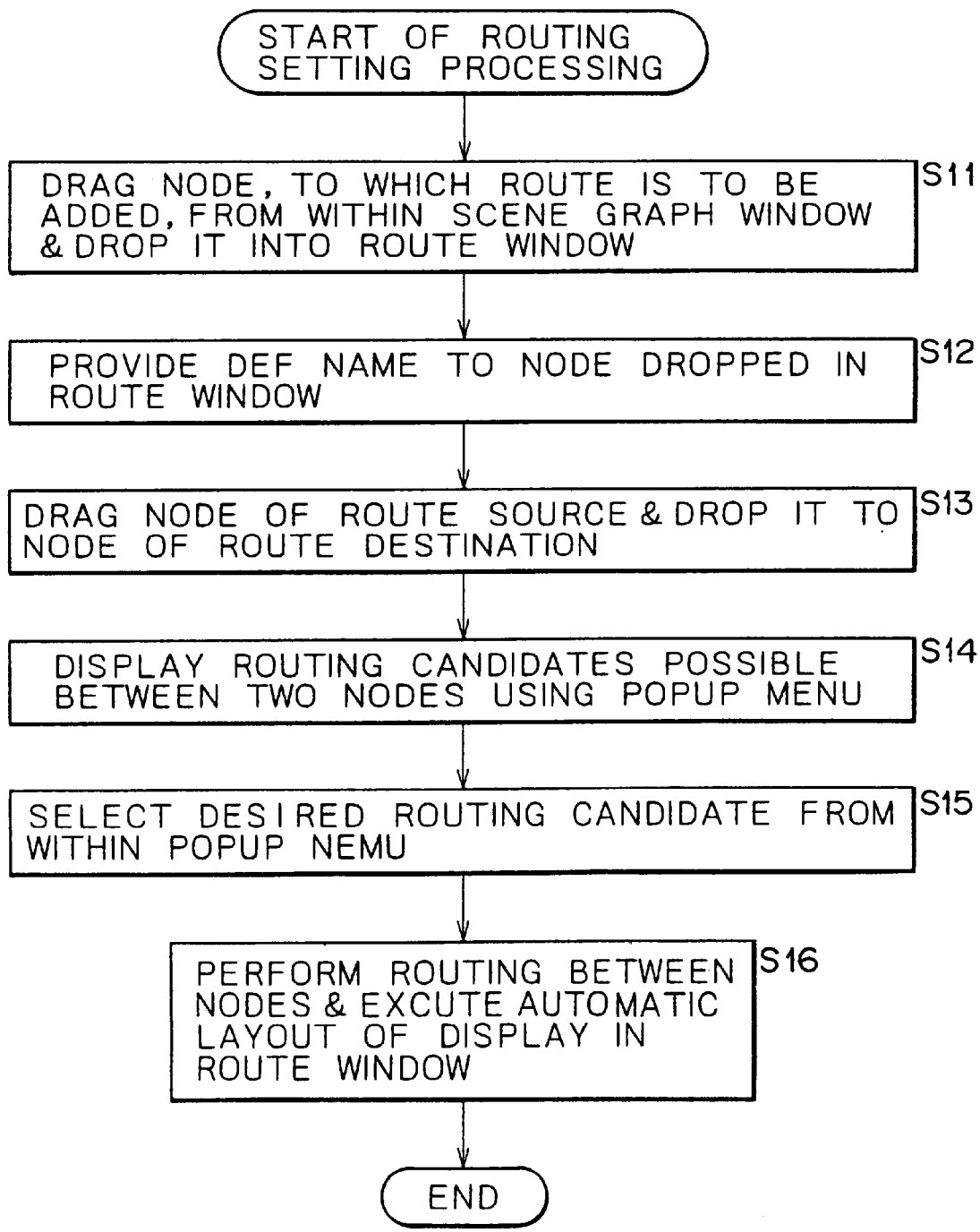
FIG. 9 is a flowchart illustrating routing setting processing.
Figure 10:
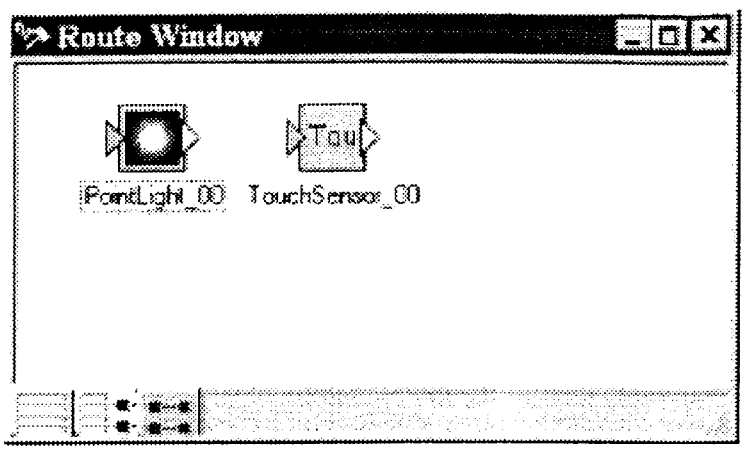
FIG. 10 is a photograph of a half-tone image illustrating a condition wherein two nodes are dropped in the route window and DEF names are provided to these nodes.

FIG. 9 is a flowchart illustrating setting processing for routing in this instance. Referring to FIG. 9, first in step S11, the user drags nodes to which a route is to be added (in the present case, the TouchSensor node and the PointLight node) from the scene graph window 76 using, for example, the mouse 38b and drop them into the route window 73. In this instance, since the nodes have no DEF names applied thereto, they can be dropped to any positions in the route window 73. Then, in step S12, the routing editing tool 522 automatically provides DEF names to the nodes which have been dropped into the route window 73 in step S11. Consequently, the DEF names of PointLight__00 and TouchSensor__00 are provided to the PointLight and TouchSensor dropped in the route window 73 as shown in FIG. 10. It is to be noted that, if a node of a DEF name used already is present in the route window, then, for example, an incremented DEF name like PointLight__01 is applied.

In step S13, the user drags the node (in the present case, the TouchSensor) of the route source (the side from which an event is to be outputted) using the mouse 38b and drop the node onto the node (in the present case, the PointLight) of the route destination (the side which receives an event). In this instance, if the mouse pointer which drags the node in the route window 73 comes to the node which allows routing thereto, an icon (for example, □) is displayed, indicating that dropping onto it is possible. Further, if the mouse pointer which drags the node in the scene graph window 76 comes to a node which does not allow routing thereto, an icon (for example, ×) is displayed, indicating that dropping onto it is not possible.

Figure 11:
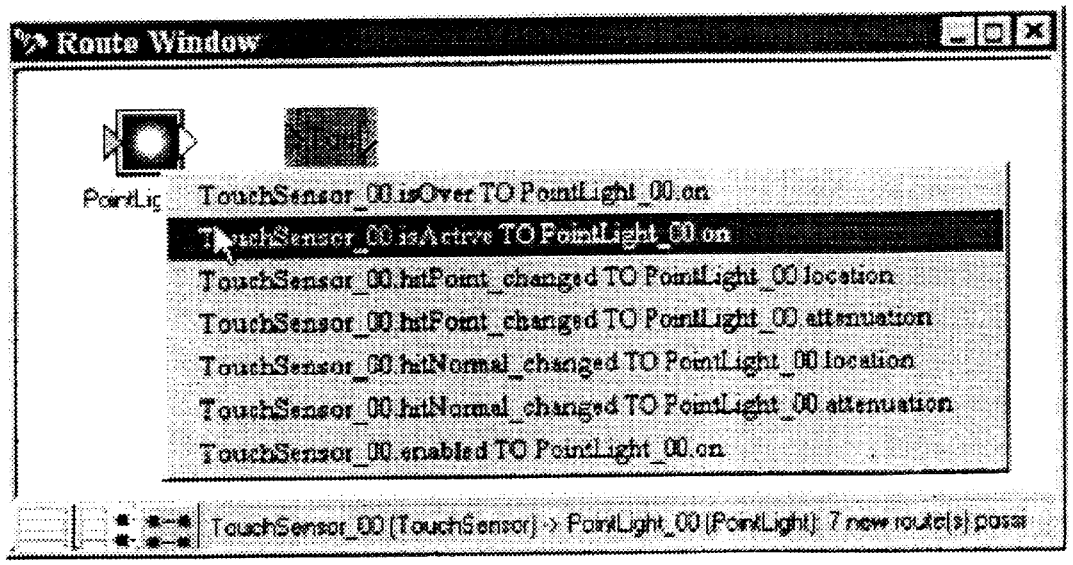
FIG. 11 is a photograph of a half-tone image showing an example of a display of route candidates between nodes.

The routing editing tool 522 displays, in step S14, candidates of possible routes between the two nodes using a popup menu as shown in FIG. 11. In the present instance, seven different route candidates for the route from the TouchSensor to the PointLight are displayed.

Figure 12:
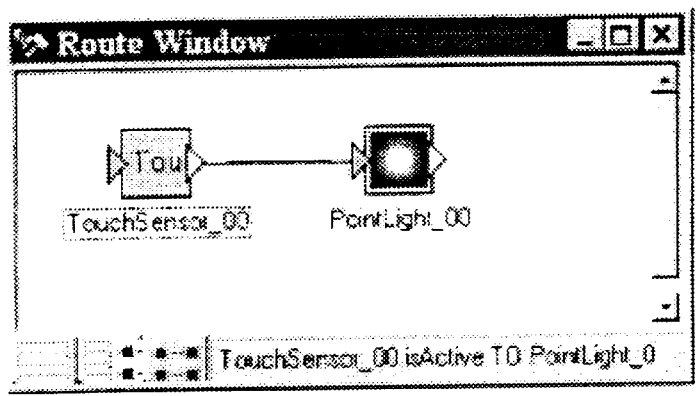
FIG. 12 is a photograph of a half-tone image illustrating a condition wherein nodes are routed in the route window.

If, in step S15, the user selects a predetermined route candidate (in the present case, the second route candidate (TouchSensor__00.isActive TO PointLight__00.on)) from top of the popup menu using the mouse 38b, then the routing editing tool 522 coordinates, in step S16 the two nodes to establish a routing associated with each other, and executes automatic layout of display (this will be hereinafter described) in the route window 73. As a result, the icon of the TouchSensor__00 and the icon of the PointLight__00 are connected to each other by a line indicating the route as shown in FIG. 12, thereby establishing a condition wherein the route is added.

Figure 13:
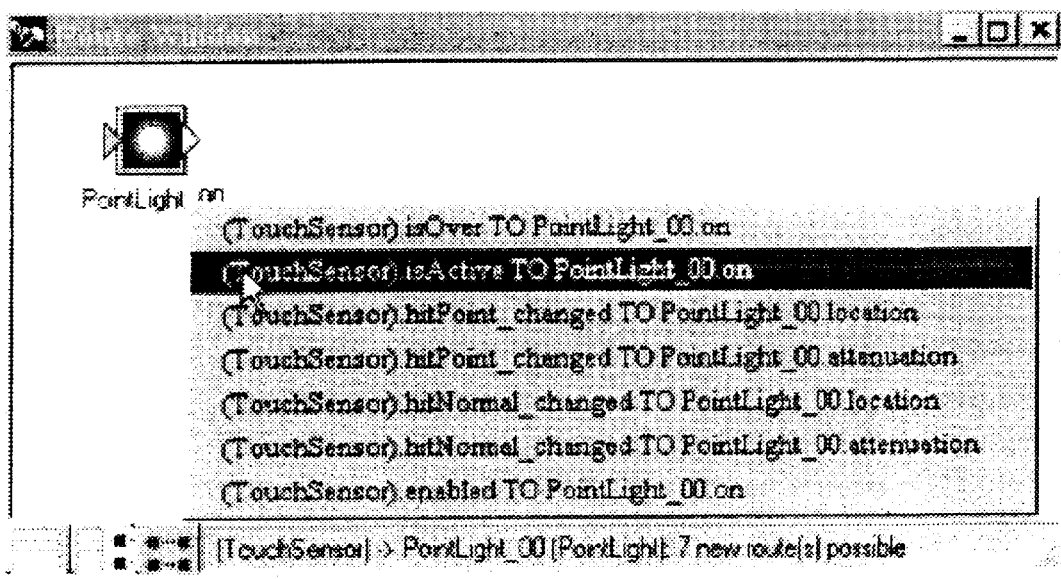
FIG. 13 is a photograph of a half-tone image showing another example of a display of route candidates between nodes.

In the processing described above, all nodes (TouchSensor and PointLight) to which a route is to be added are dragged out from the scene graph window 76 and dropped into the route window 73. However, it is otherwise possible, for example, to drag, in a condition wherein an icon of a predetermined node (for example, PointLight__00 of the route destination) is displayed in the route window 73, another node (for example, Touchsensor of the route source), from which a route is to be added to the predetermined node, from the scene graph window 76 and drop the node to be added to the icon of the node displayed in the route window 73 to add a route. An example of a display of the route window 73 in this instance is shown in FIG. 13. In the example shown in FIG. 13, candidates for the route are displayed as a popup menu similarly as in the case described hereinabove in connection with step S14. While the description of Touchsensor in the menu is "TouchSensor", this indicates that no DEF menu has been given to the dropped TouchSensor node as yet.

Figure 14:
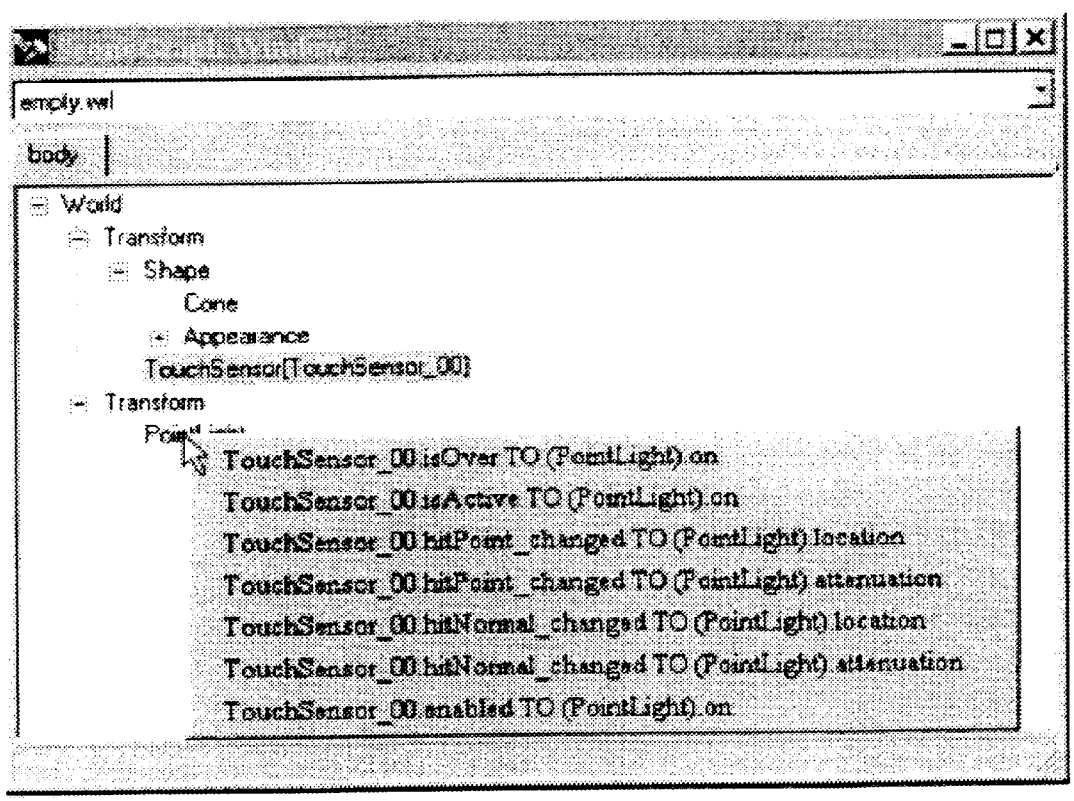
FIG. 14 is a photograph of a half-tone image showing a further example of a display of route candidates between nodes.

Conversely, it is possible to drag a node in the route window 73 and drop it to another node in the scene graph window 76. For example, if, in a condition wherein only an icon of the TouchSensor__00 node is displayed in the route window 73, the icon is dragged and then dropped onto the PointLight node displayed in the scene graph window 76, route candidates are displayed as a popup menu as shown in FIG. 14. Also in this instance, the description of PointLight in the menu is "PointLight", and this indicates that no DEF name has been given to it as yet. By selecting a desired candidate from this menu, a route can be added.

Figure 15:
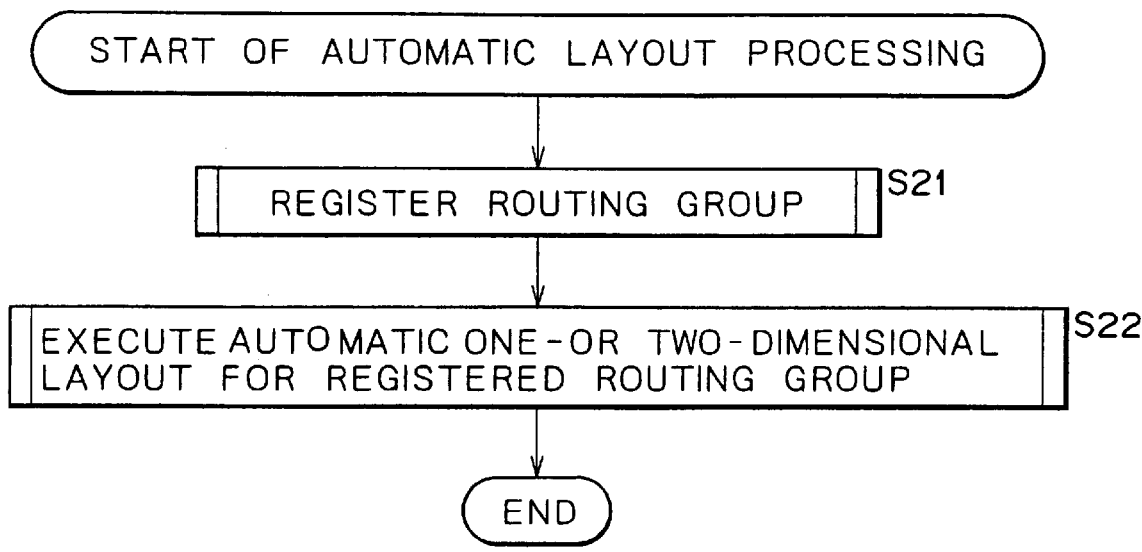
FIG. 15 is a flowchart illustrating automatic layout processing.
Figure 16A:
FIGS. 16A and 16B are diagrammatic views illustrating examples of a one-dimensional layout and a two-dimensional layout of nodes, respectively.
Figure 16B:
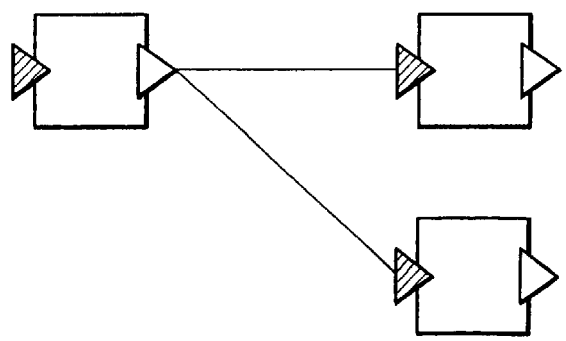

Subsequently, automatic layout executed by the routing editing tool 522 in the routing setting processing described above is described. FIG. 15 illustrates a flow of general processing of the automatic layout. Referring to FIG. 15, in step S21, the routing editing tool 522 registers a routing group to which two routed nodes belong. In step S22, the routing editing tool 522 executes, for each registered routing group, automatic one-dimensional layout (for example, layout in which icons are juxtaposed in one row as shown in FIG. 16A) processing or automatic two-dimensional layout (for example, layout by which irons are juxtaposed in two rows as shown in FIG. 16B) processing.

In the routing group production processing of step S21, a routing group is produced from the added route. This routing group indicates a dependence of the route, that is, a dependence relationship between the routed nodes, and further indicates that an event is not communicated between different routing groups. The processing of step S21 is described with reference to a flowchart of FIG. 17.

The routing editing tool 522 checks, in step S31, whether or not a routing group to which the node of the route source belongs is present, and checks, in step S32, whether or not a routing group to which the node of the route destination belongs is present. In step S33, it is discriminated whether or not both of the routing groups to which the node of the route source belongs and a routing group to which the node of the route destination belongs are present. If it is discriminated in step S33 that both are present, then the control advances to step S34, in which the routing editing tool 522 merges the two routing groups into one group and registers thus merged group as a routing group between the nodes.

If it is discriminated in step S33 that both of a routing group to which the node of the route source belongs and a routing group to which the node of the route destination belongs are not present, then the control advances to step S35, in which it is discriminated whether or not a routing group to which one of the two nodes belongs is present. If it is discriminated that a routing group to which either one of the nodes belongs is present, then the control advances to step S36, where the routing editing tool 522 registers the routing group between the nodes as a routing group.

If it is discriminated in step S35 that a routing group to which none of the nodes belongs is not present, then the control advances to step S37, where the routing editing tool 522 produces a new routing group and registers the group between the nodes as a routing group, whereafter the control advances to step S22 of FIG. 15.

Now, the processing of step S22 shown in FIG. 15 is described. When automatic one-dimensional layout is to be performed for a registered routing group, nodes in the routing group are sorted in the alphabetical order or in the order of topology (so that the node of the route source may be displayed at the leftmost end) and are displayed in a row (FIG. 16A).

On the other hand, when automatic two-dimensional layout is to be performed for a registered routing group, processing of a flowchart of FIG. 18 is executed. Referring to FIG. 18, first in step S41, the routing editing tool 522 selects an arbitrary node from the routing group and defines it as node[0]. Then in step S42, the routing editing tool 522 adds the node[0] to a column[0]. In step S43, the routing editing tool 522 executes ColumnSort(node[0]). Then, in step S44, the routing editing tool 522 re-arranges the ColumnSorted routing groups (see FIG. 16B).

Figure 19:
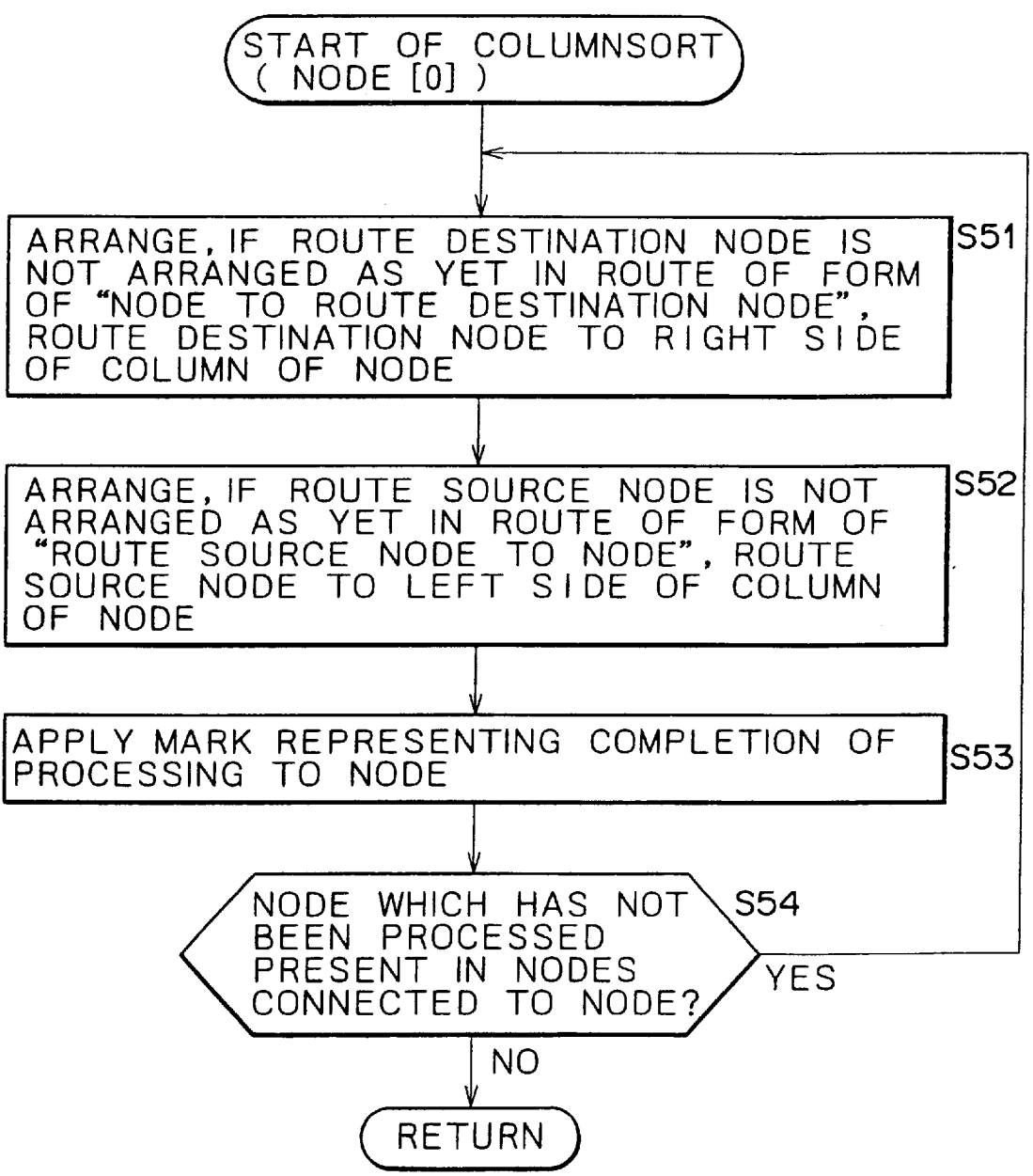
FIG. 19 is a flowchart illustrating processing of ColumnSort(node[0]) of FIG. 18.

Subsequently, details of the processing of the ColumnSort (node[0]) in step S43 of FIG. 18 is described with reference to FIG. 19. First in step S51, the routing editing tool 522 arranges, if no route destination node is arranged as yet to a route having the form of "node TO route destination node", the node of the route destination to the right side of a row of nodes. In step S52, if no route source node is arranged as yet to a route having the form of "route source node TO node", the routing editing tool 522 arranges the node of the route source to the left side of the row of nodes.

In step S53, the routing editing tool 522 applies to the node a mark representing that processing has been performed thereto. Then in step S54, the routing editing tool 522 discriminates whether or not there remains a non-processed node among the nodes connected to the node. If it is discriminated that there remains a non-processed node, the control returns to step S51 the same processing is performed again. If it is discriminated in step S54 that processing for all nodes connected to the node is completed, the processing is ended and the control advances to step S44 of FIG. 18.

The routing editing tool 522 executes automatic layout processing in such a manner as described above. Consequently, the user can intuitively recognize a condition of routing at present.

Figure 20:
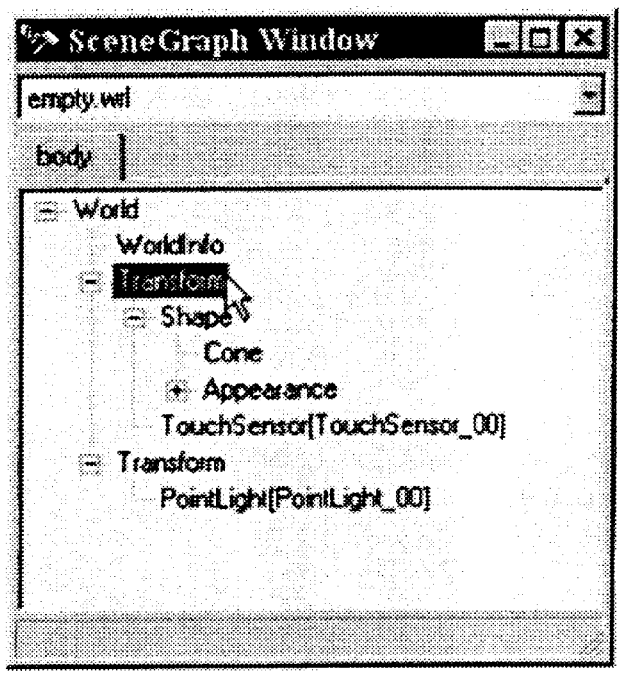
FIG. 20 is a photograph of a half-tone image showing an example of a display of the scene graph window.
Figure 21:
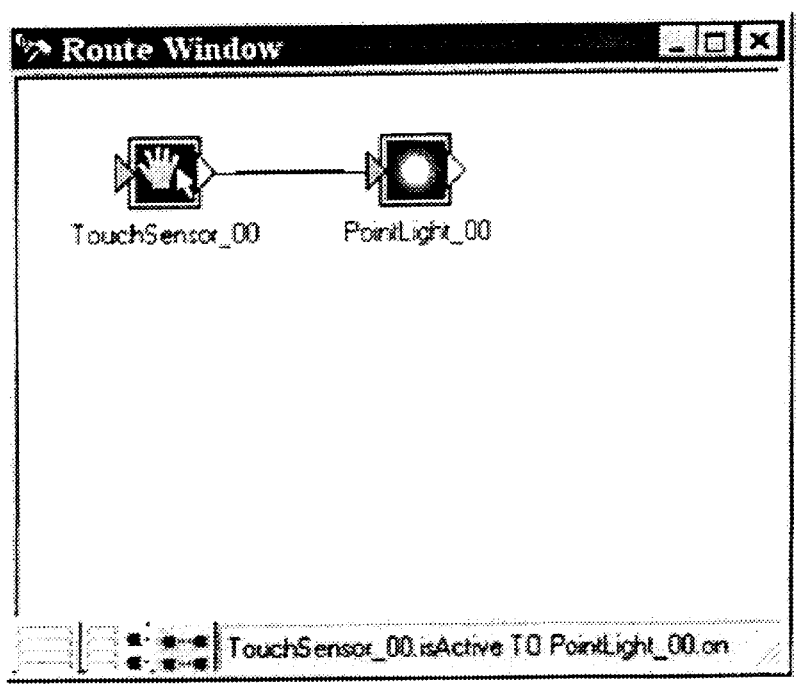
FIG. 21 is a photograph of a half-tone image showing an example of a display of the route window.

Subsequently, it is assumed that the scene graph window 76 in which, for example, such a hierarchical structure of nodes as shown in FIG. 20 is displayed and the route window 73 in which the TouchSensor_00 and the PointLight_00 are routed as shown in FIG. 21 are in an open condition. In the scene graph window 76 of FIG. 20, the Transform node including a Cone node is selected by the mouse pointer. A case wherein the selected Transform node is deleted in this condition is considered. As shown in FIG. 20, the Transform node includes a Shape node including a Cone node and a TouchSensor node, and the TouchSensor node is routed to a PointLight node as apparently shown from FIG. 21.

Then, if the Transform node is deleted, the route set between the TouchSensor and PointLight nodes is also automatically deleted. However, where a predetermined node is deleted in this manner, it is difficult to discriminate which nodes in the route window 73 are deleted in a corresponding relationship with the deleted predetermined node unless the scene graph in the scene graph window 76 is closely examined.

Figure 22:
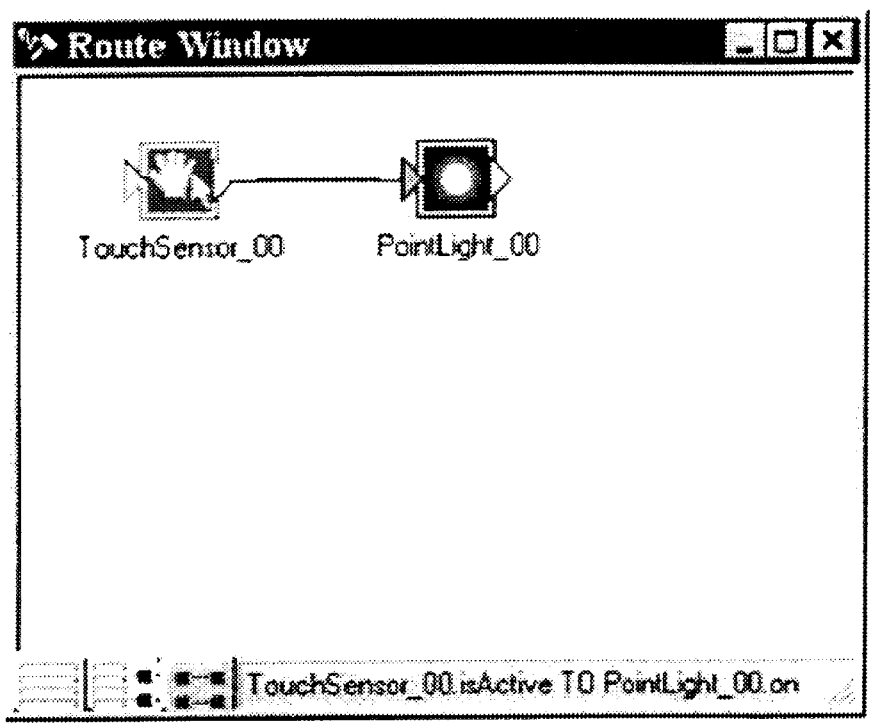
FIG. 22 is a photograph of a half-tone image illustrating a condition wherein a TouchSensor_00 shown in the route window of FIG. 21 is fade-out displayed.
Figure 23:
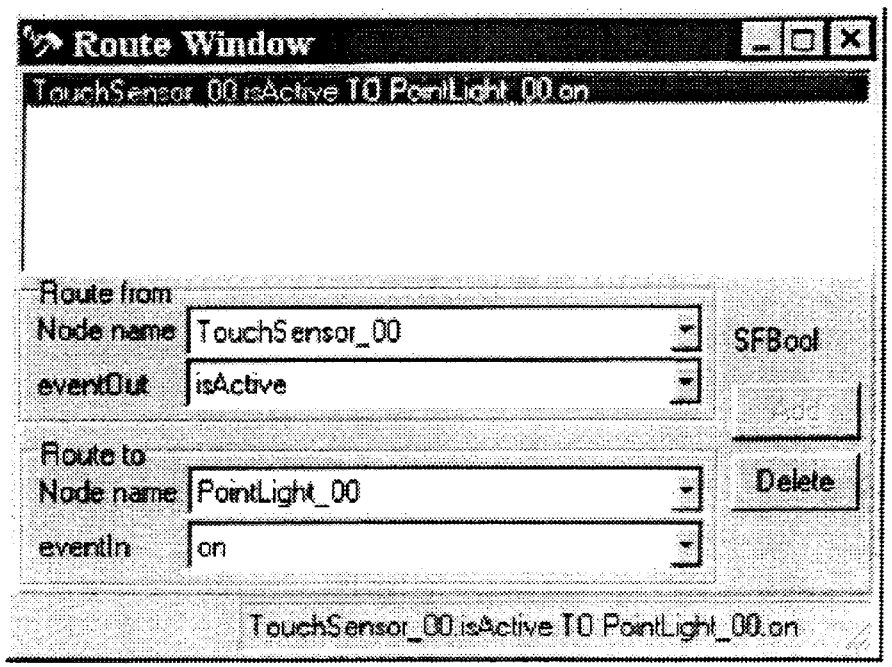
FIG. 23 is a photograph of a half-tone image showing a related art routing editing window.

In FIG. 22, from among the nodes in the route window 73, those nodes which have a dependence relationship to the node selected in the scene graph window 76 are fade-out displayed. In this instance, the TouchSensor node which depends upon the Transform node is fade-out displayed. Such display is possible by switching environmental settings. In short, while nodes which have a dependence relationship are not normally displayed in the route window 73, when a mode wherein nodes which have a dependence relationship are to be displayed in the route window 73 is set, a node which depends upon the node selected in the scene graph window 76 at present can be fade-out displayed.

Consequently, the user can visually discriminate, when such processing as cutting or pasting is to be performed in the scene graph window 76, which node of routing is influenced by the processing.

It is to be noted that the computer program which provides such various processes as described above can be provided to a user through a recording medium such as a magnetic disc or a CD-ROM, or provided to a user through a providing medium such as a network so that, when necessary, the computer program may be recorded in a built-in RAM or hard disc for practical use.

While a preferred embodiment of the present invention has been described using specific terms, such description is for illustrative purpose only, and it is to be understood that changes and variations may be made without departing from the spirit or scope of the following claims.

What is claimed is:

1. An information processing apparatus which performs routing to interconnect nodes in order to allow transmission of an event between said nodes, comprising:

dragging means for dragging a first node displayed in a first window for displaying and editing said nodes hierarchically or a second window for editing the routing;

dropping means for dropping said first node dragged by said dragging means to a second node displayed in said first window or said second window;

display means for displaying, when said first node is dropped onto said second node by said dropping means, route candidates which can be set between said first node and said second code;

selection means for selecting a predetermined route candidate from the route candidates displayed by said display means; and setting means for setting the route candidate selected by said selection means as a route between said first node and said second node;

wherein said setting means is further configured to register a routing group to which said first and second nodes belong, and for executing automatic layout display of said registered routing group.

2. The apparatus of claim 1 further comprising addition means for applying, when said predetermined node is dropped into the second window by said dropping means, if said node does not have a name applied thereto, a name to said node.

3. The apparatus of claim 1 wherein said second window displays said first node, said second node or the route using an icon.

4. The apparatus of claim 1 further comprising second display means for displaying, when said first node is dragged to a position on said second node by said dragging means, and if routing is possible between said first node and said second node, that the dropping is possible; and third display means for displaying, if the routing between said first node and said third node is impossible, that the dropping is impossible.

5. The apparatus of claim 1 further comprising layout means for laying out display contents of said second window in accordance with the setting by said setting means.

6. The apparatus of claim 1 further comprising indication means for indicating predetermined nodes displayed in said first window, and second display means for displaying, to any of the nodes displayed in said second window which depends upon the node indicated by said indication means, that the node is in a dependence relationship.

7. The apparatus of claim 6 wherein said second display means fade-out displays the node which depends upon the node indicated by said indication means.

8. The apparatus of claim 1 wherein said setting means is configured to generate said registered routing group based on said selected predetermined route candidate.

9. The apparatus of claim 8 wherein said routing group indicates a relationship between said first and second nodes.

10. The apparatus of claim 1 wherein said automatic layout display is one of a one-dimensional layout and a two-dimensional layout.

11. The apparatus of claim 10 wherein when said layout display is said one-dimensional layout, nodes in said registered routing group are sorted in one of an alphabetical order and a topology order.

12. An information processing method wherein routing is performed to interconnect nodes in order to allow transmission of an event between said nodes, comprising the steps of:

dragging a first node displayed in a first window for displaying and editing the nodes hierarchically or a second window for editing the routing;

dropping the first node dragged by the dragging step to a second node displayed in the first window or the second window;

displaying, when the first node is dropped to the second node, route candidates which can be set between the first node and the second node;

selecting a route candidate from the route candidates displayed by the displaying step; and setting the route candidate selected by the selecting step as a route between the first node and the second node;

wherein said setting step further includes the steps of registering a routing group to which said first and second nodes belong, and executing automatic layout display of said registered routing group.

13. The method of claim 12 further including the step of applying, when said predetermined node is dropped into the second window at said dropping step, if said node does not have a name applied thereto, a name to said node.

14. The method of claim 12 wherein said second window displays said first node, said second node or the route using an icon.

15. The method of claim 12 wherein said displaying step further includes the steps of displaying, when said first node is dragged to a position on said second node at said dragging step and if routing is possible between said first node and said second node, that the dropping is possible, and displaying, if the routing between said first node and said third node is not possible, that the dropping is not possible.

16. The method of claim 12 further including the step of laying out display contents of said second window in accordance with the setting at said setting step.

17. The method of claim 12 further including the step of indicating predetermined nodes displayed in said first window, wherein said displaying step further includes the step of displaying, to any of the nodes displayed in said second window which depends upon the node indicated at said indicating step, that the node is in a dependence relationship.

18. The method of claim 17 wherein said step of displaying fade-out displays the node which depends upon the node indicated at said indication step.

19. The method of claim 17 wherein said setting step further includes the step of generating said registered routing group based on said selected predetermined route candidate.

20. The method of claim 19 wherein said routing group indicates a relationship between said first and second nodes.

21. The method of claim 17 wherein said automatic layout display is one of a one-dimensional layout and a two-dimensional layout.

22. The method of claim 21 wherein when said layout display is said one-dimensional layout, nodes in said registered routing group are sorted in one of an alphabetical order and a topology order.

23. A providing medium for providing a computer program which can be read and executed by an information processing apparatus, said program configured to perform routing to interconnect nodes in order to allow transmission of an event between said nodes, comprising the steps of:

dragging a first node displayed in a first window for displaying and editing the nodes hierarchically or a second window for editing the routing;

dropping the first node dragged by the dragging step to a second node displayed in the first window or the second window;

displaying, when the first node is dropped to the second node, route candidates which can be set between the first node and the second code;

selecting a route candidate from the route candidates displayed by the displaying step; and setting the route candidate selected by the selecting step as a route between the first node and the second node; wherein said setting step further includes the steps of registering a routing group to which said first and second nodes belong, and executing automatic layout display of said registered routing group.

24. The medium of claim 23 wherein said computer program is further configured to execute the step of applying, when said predetermined node is dropped into the second window at said dropping step, if said node does not have a name applied thereto, a name to said node.

25. The medium of claim 23 wherein said second window displays said first node, said second node or the route using an icon.

26. The medium of claim 23 wherein, in said computer program, said displaying step further includes the steps of displaying, when said first node is dragged to a position on said second node at said dragging step and if routing is possible between said first node and said second node, that the dropping is possible, and displaying, if the routing between said first node and said third node is not possible, that the dropping is not possible.

27. The medium of claim 23 wherein said program further includes the step of laying out display contents of said second window in accordance with the setting at said setting step.

28. The medium of claim 23 wherein said program further includes the step of indicating predetermined nodes displayed in said first window, wherein said displaying step further includes the step of displaying, to any of the nodes displayed in said second window which depends upon the node indicated at said indicating step, that the node is in a dependence relationship.

29. The medium of claim 28 wherein, in said program, said step of displaying fade-out displays the node which depends upon the node indicated at said indication step.

30. The medium of claim 23 wherein, in said program, said setting step further includes the step of generating said registered routing group based on said selected predetermined route candidate.

31. The medium of claim 30 wherein said routing group indicates a relationship between said first and second nodes.

32. The medium of claim 23 wherein said automatic layout display is one of a one-dimensional layout and a two-dimensional layout.

33. The medium of claim 32 wherein when said layout display is said one-dimensional layout, nodes in said registered routing group are sorted in one of an alphabetical order and a topology order.

34. An information processing apparatus which performs routing to interconnect nodes in order to allow transmission of an event between said nodes, comprising:

a pointing device for dragging a first node displayed in a first window for displaying and editing said nodes hierarchically or a second window for editing the routing, and for dropping said first node to a second node displayed in said first window or said second window;

a display for displaying, when said first node is dropped onto said second node by said pointing device, route candidates which can be set between said first node and said second code, said pointing device further configured to select a predetermined route candidate from the route candidates displayed by said display; and a controller for setting the route candidate selected by said pointing device as a route between said first node and said second node;

wherein said controller is further configured to register a routing group to which said first and second nodes belong, and to execute automatic layout display of said registered routing group.

35. The apparatus of claim 34 wherein said controller is further configured to apply, when said predetermined node is dropped into the second window and if said node does not have a name applied thereto, a name to said node.

36. The apparatus of claim 34 wherein said second window displays said first node, said second node or the route using an icon.

37. The apparatus of claim 34 wherein said controller is configured to control said display such that, when said first node is dragged to a position on said second node and if routing is possible between said first node and said second node, displaying that the dropping is possible, and such that, if the routing between said first node and said third node is not possible, displaying that the dropping is not possible.

38. The apparatus of claim 34 further wherein said controller is further configured to lay out display contents of said second window in accordance with setting the route candidate.

39. The apparatus of claim 34 wherein said controller is further configured to indicate predetermined nodes displayed in said first window, and to display to any of the nodes displayed in said second window which depends upon the indicated node, that the node is in a dependence relationship.

40. The apparatus of claim 39 wherein said controller fade-out displays the node which depends upon the indicated node.

41. The apparatus of claim 34 wherein said controller is further configured to generate said registered routing group based on said selected predetermined route candidate.

42. The apparatus of claim 41 wherein said routing group indicates a relationship between said first and second nodes.

43. The apparatus of claim 34 wherein said automatic layout display is one of a one-dimensional layout and a two-dimensional layout.

44. The apparatus of claim 43 wherein when said layout display is said one-dimensional layout, nodes in said registered routing group are sorted in one of an alphabetical order and a topology order.

* * * * *

UNITED STATES PATENT AND TRADEMARK OFFICE
CERTIFICATE OF CORRECTION

PATENT NO. : 6,281,900 B1
DATED : August 28, 2001
INVENTOR(S) : Masayuki Ishikawa It is certified that error appears in the above-identified patent and that said Letters Patent is hereby corrected as shown below:

Column 4,
Lines 14 and 26, please change "code" to -- node --.

Column 5,
Line 59, please change "code" to -- node --,
Line 66, please change "one" to -- another --.

Column 13,
Line 56, please change "drop" to -- drops --.

Column 14,
Line 3, please change "drop" to -- drops --.

Column 17,
Line 15, please change "code" to -- node --.

Column 19,
Line 3, please change "code" to -- node --.

Signed and Sealed this

Second Day of April, 2002

Attest:

JAMES E. ROGAN
Attesting Officer  *Director of the United States Patent and Trademark Office*